United States Patent
Yoshida et al.

(10) Patent No.: US 6,720,963 B2
(45) Date of Patent: Apr. 13, 2004

(54) THREE-DIMENSIONAL CAD SYSTEM AND RECORDING MEDIUM FOR THREE-DIMENSIONAL CAD SYSTEM

(75) Inventors: Yasuhiko Yoshida, c/o CITEC Corporation 28-1, Futatsuike, Nihongimachi, Anjyou-shi, Aichi-ken (JP); Eiji Shiiba, Anjyou (JP)

(73) Assignees: CITEC Corporation, Anjyou (JP); Yasuhiko Yoshida, Anjyou (JP)

( * ) Notice: Subject to any disclaimer, the term of this patent is extended or adjusted under 35 U.S.C. 154(b) by 325 days.

(21) Appl. No.: 09/797,003

(22) Filed: Mar. 2, 2001

(65) Prior Publication Data

US 2001/0033281 A1 Oct. 25, 2001

(30) Foreign Application Priority Data

Mar. 6, 2000 (JP) ........................................ 2000-059930

(51) Int. Cl.[7] .............................................. G06T 15/00
(52) U.S. Cl. ...................................................... 345/420
(58) Field of Search .................................. 345/419, 420, 345/619, 427

(56) References Cited

U.S. PATENT DOCUMENTS

| | | | |
|---|---|---|---|
| 4,821,214 A | * | 4/1989 | Sederberg .................... 345/420 |
| 5,185,855 A | | 2/1993 | Kato et al. ................... 395/129 |
| 6,236,403 B1 | * | 5/2001 | Chaki et al. ................. 345/420 |

OTHER PUBLICATIONS

Foley et al., "Computer Graphics Principles and Practice," 1992, pp. 478–501.*

J.D. Foley et al.: "Computer Graphics: principles and practice" 1990, Addison Wesley, ISBN 0–21–12110–7, Reading, Mass. et al., XP–002239762, p. 290, paragraph 4.

* cited by examiner

Primary Examiner—Phu C. Nguyen
(74) Attorney, Agent, or Firm—Westerman, Hattori, Daniels & Adrian LLP

(57) ABSTRACT

According to the 3D-CAD system of the present invention, basic graphic elements (PL, LL, SL, VL) are set based on linear, area or volume coordinate parameters, and the plurality of basic graphic elements are continuously connected to generate a basic graphic. The basic graphic elements constituting the generated basic graphic are continuously differentiable even after deformation, thereby generating a desired solid graphic (identical topology graphic). By using these patches for approximately expressing all surfaces, the surfaces are handled consistently, the data quantity describing the graphics is greatly reduced, and the load of operational processing of the computer is reduced. Whether or not an element can be deleted is determined based on a reference counter RC showing whether said element is the component of another element.

4 Claims, 20 Drawing Sheets

Triangular area coordinate parameters and mapped space

Fig. 1
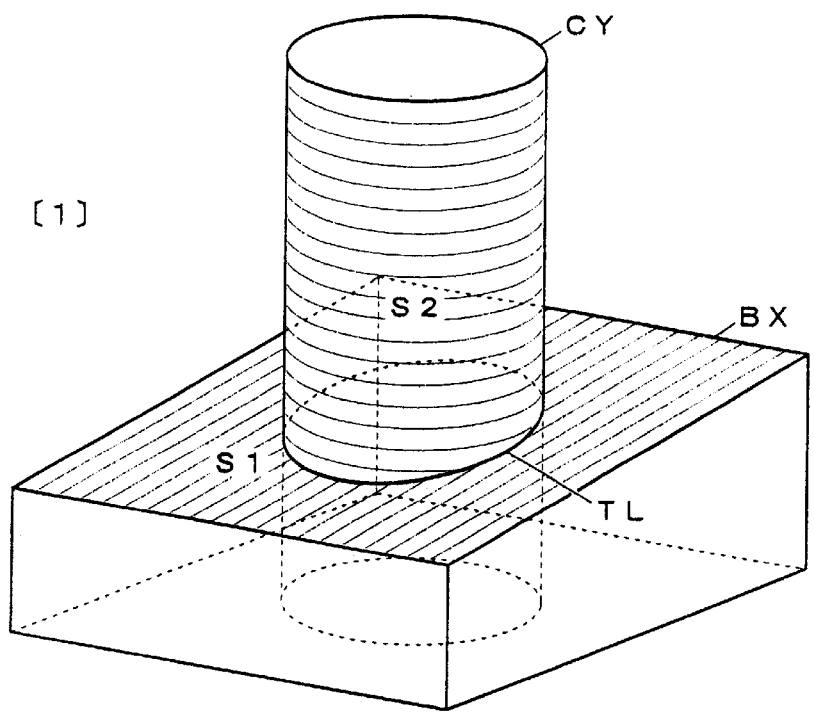
[1]
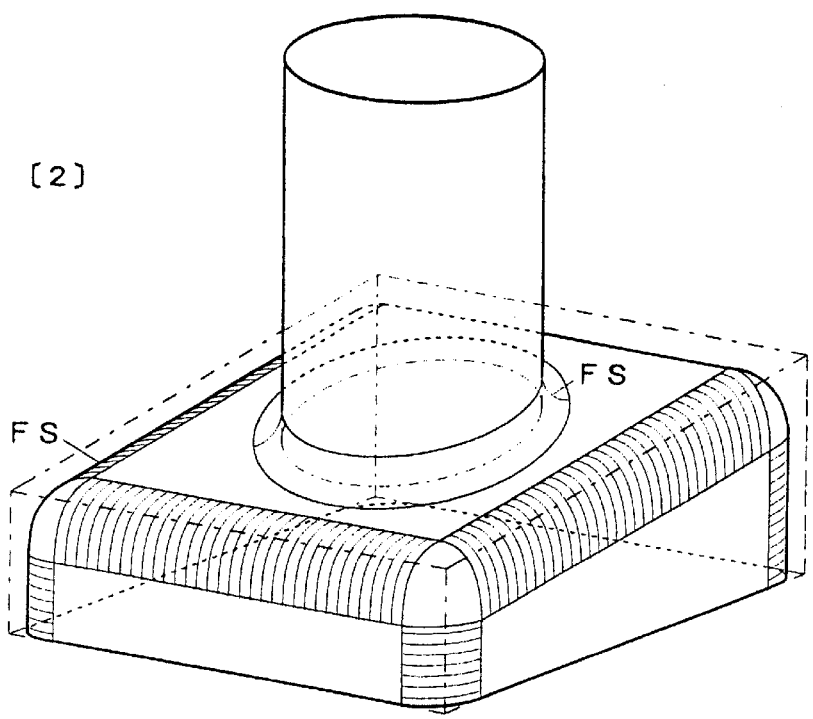
[2]
Graphics according to the conventional art

Parameter and mapped space based on the conventional method

Polygonal approximation based on the conventional method

Class structures of shape model data

Fig. 5
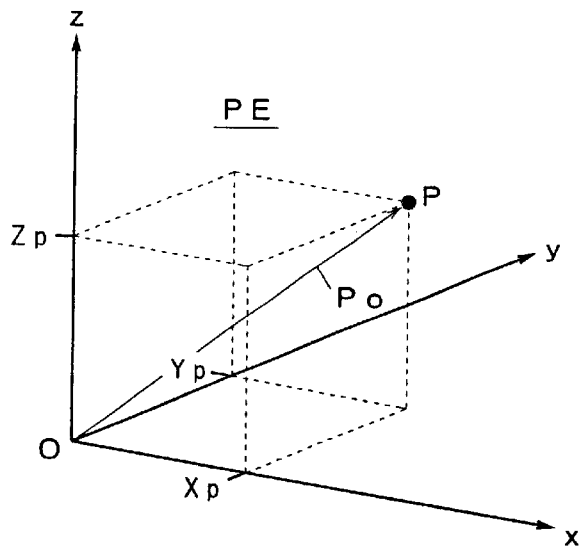
(1) Point element PE
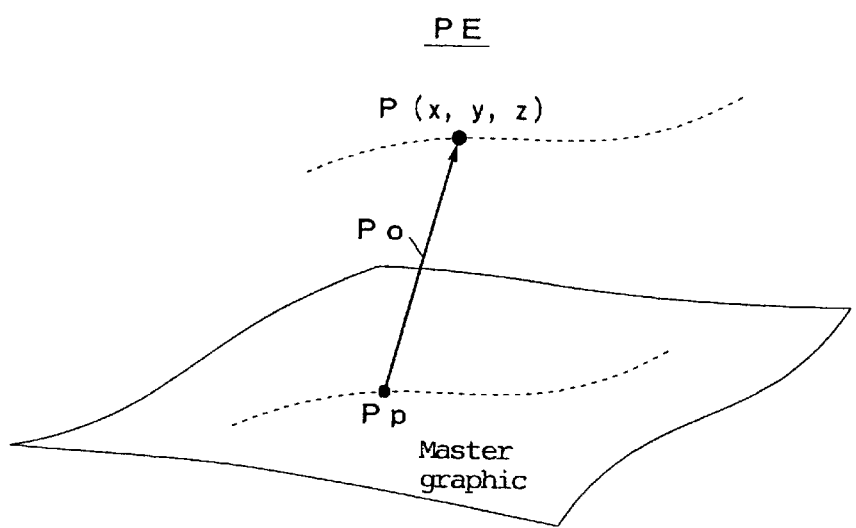
(2) Point element having a master graphic
Point Element Fig. 6
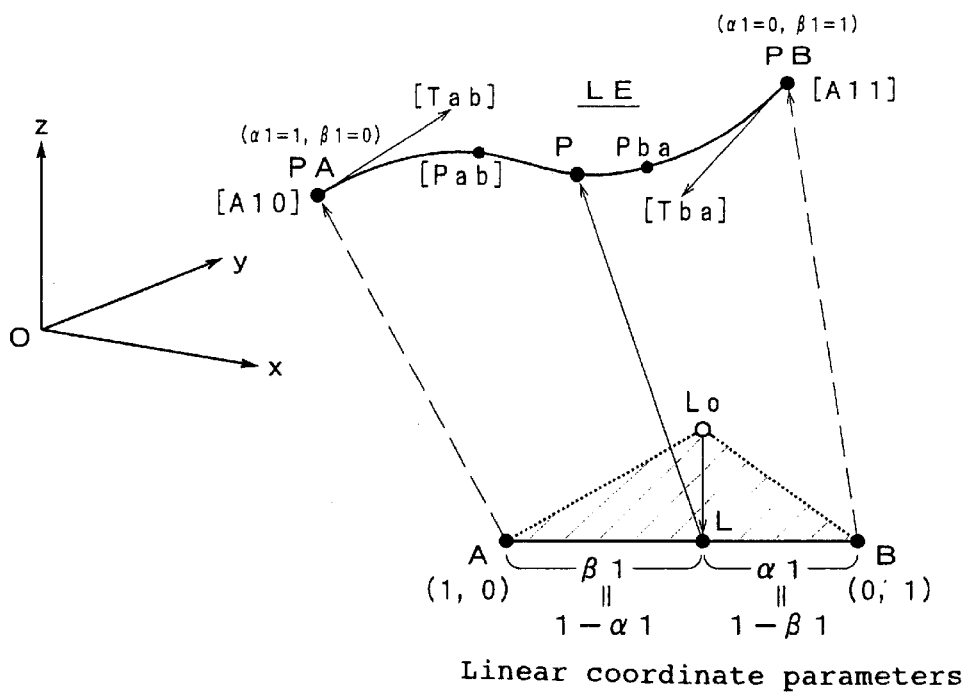
(1) Line element LE
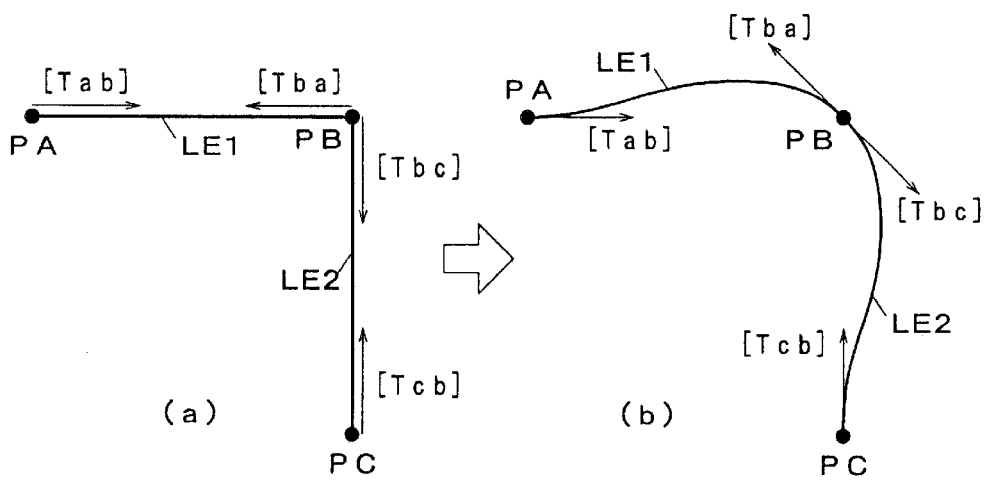
(2) Example of tangent continuation between line elements
Line (Curve) Element Triangular area coordinate parameters and mapped space Quadrilateral area coordinate parameters and mapped space Meaning of quadrilateral area coordinates Example of tangent continuity of borer lines constituting a quadrilateral surface element Concept of polygonal area coordinate parameters Fig. 12
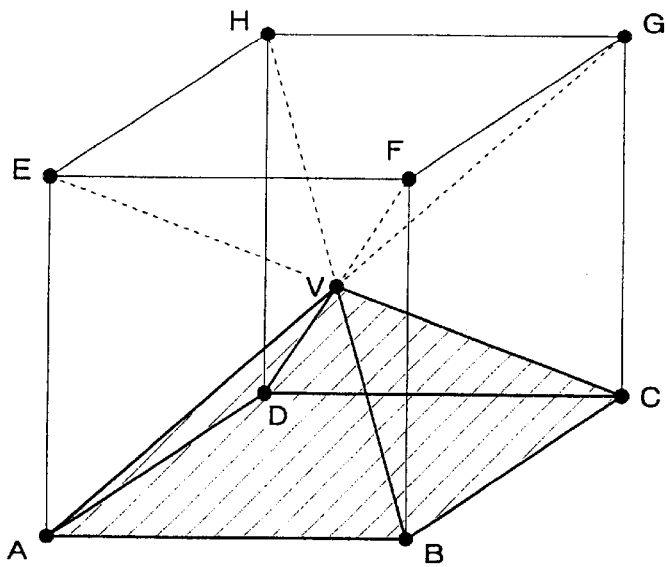
(1) Hexahedron volume coordinates
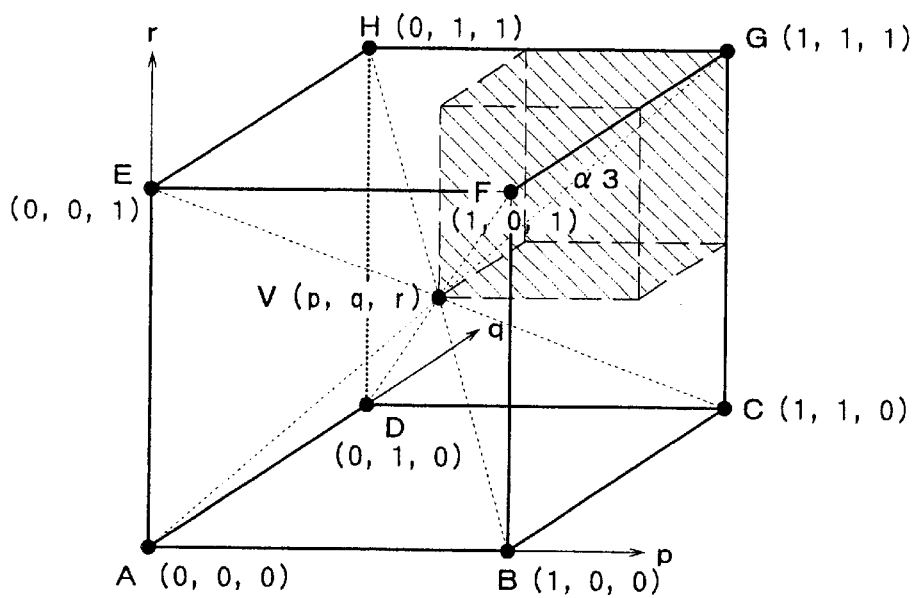
(2) Meaning of hexahedron volume coordinate parameters
Example of volume coordinate parameters Fig. 13  Data structure of point, line, surface and solid elements System block diagram Processing example of 3D graphic modeling Graphic generation by topology [1]

Fig. 17
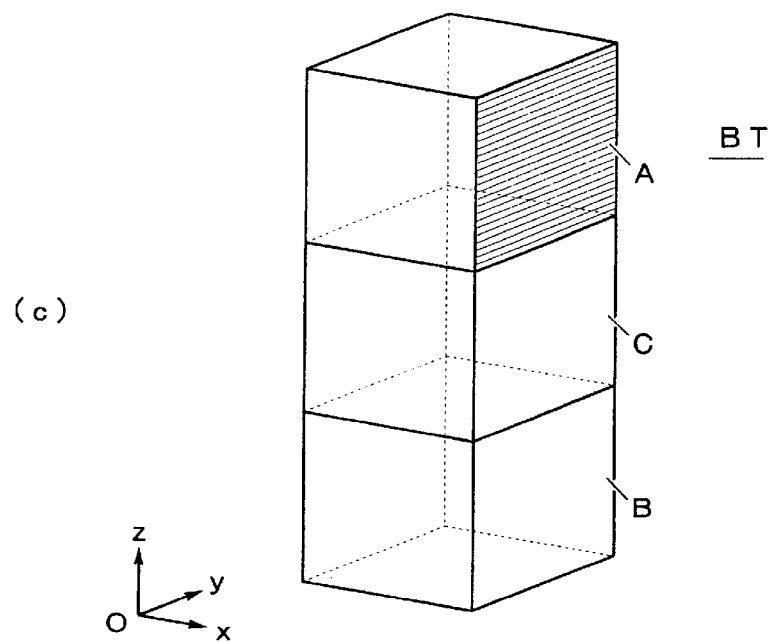
(c)
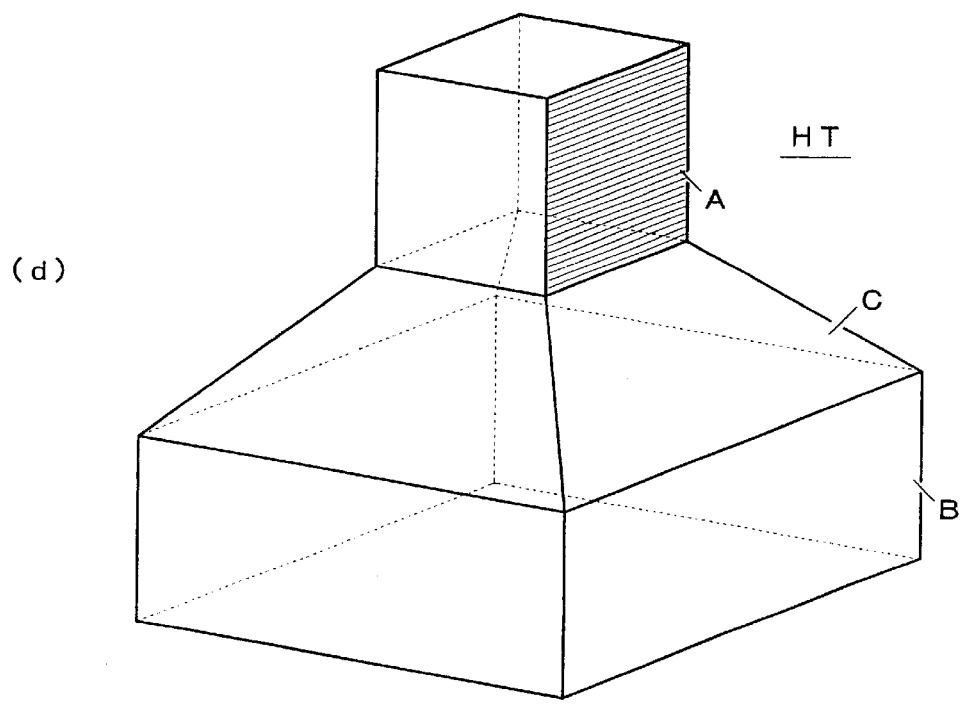
(d)
Graphic generation by topology [2]

(e)

Graphic generation by topology [3]

(f)

Graphic generation by topology [4]

(g)

Graphic generation by topology [5]

THREE-DIMENSIONAL CAD SYSTEM AND RECORDING MEDIUM FOR THREE-DIMENSIONAL CAD SYSTEM

FIELD OF THE INVENTION

The present invention relates to a three-dimensional CAD (three-dimensional computer aided design: 3D-CAD) system, particularly to a three-dimensional CAD system applying a basic geometric theory called "topology CAD" (topology-applied CAD), and the recording medium utilized for the system.

DESCRIPTION OF THE RELATED ART

Currently, a system called a "three-dimensional CAD" is widely noticed, which enables the user to create a three-dimensional design using a computer. Most of the conventionally used 3D-CAD applies a method so-called a "solid CAD using Boolean expression".

According to the method of solid CAD using Boolean expression, in order to define a solid graphic as shown in FIG. 1 where a cylinder CY penetrates above a square box BX, two basic graphics, the cylinder CY and the solid BX, are superposed, the intersection curve(trim line) TL of surface S1 and surface S2 is computed, and a "trimming process" is performed thereto where unnecessary portion of the surfaces are removed. Moreover, the Boolean operation tends to create an angular or boxy graphic, so it is necessary to provide thereto a process called a "fillet process" where the angular surfaces are rounded using a fillet surface FS. However, both the trim line TL and the fillet surface FS are approximate solutions, and accurately, the surfaces are not connected to each other.

Generally, the three-dimensional curved surface within a three-dimensional rectangular coordinate system having x, y, z axes representing real space is mathematically expressed as shown in the following equation (1):

$$f(x, y, z)=0 \qquad (1)$$

However, according to conventional CAD system, parameters ($\alpha$, $\beta$) are commonly used to represent a point (x, y, z) within a rectangular coordinate system as shown in the following equation (2):

$$(x, y, z)=S(\alpha, \beta) \qquad (2)$$

wherein S is a vector function.

Here, we will refer to this surface (plane) defined by ($\alpha$, $\beta$) as a "parameter plane", and the surface in real-space defined by a group of infinite points (x, y, z) corresponding to this parameter plane ($\alpha$, $\beta$) is referred to as "mapped plane".

In this case, according to a normal CAD method, as shown in FIG. 2, the parameter plane ($\alpha$, $\beta$) is defined by a regular quadrilateral shape on a rectangular coordinate axis [vertex (0, 0), (1, 0), (1, 1), (0, 1)], the mapped plane is defined within this square region in the parameter plane, therefore a surface in real-space is expressed usually within the range of $0 \leq \alpha$, $\beta \leq 1$. FIG. 2 shows that within the parameter plane ($\alpha$, $\beta$), there are (m+1) points in direction $\alpha$ ($\alpha=0, \alpha=\alpha 1, \alpha=\alpha 2, \ldots, \alpha=1$), and (n+1) points in direction $\beta$ ($\beta=0$, $\beta=\beta 1$, $\beta=\beta 2$, $\ldots$, $\beta=1$); a total of (m+1)×(n+1) control points are set, and that the mapped plane (vertex Poo, Pmo, Pmn, Pon) is defined corresponding to these control points. The point P (x, y, z) on the mapped plane in real-space is the function of parameters $\alpha$, $\beta$ using the rectangular coordinate system, and can be expressed by the following equations (3):

$$x=X(\alpha, \beta) \; y=Y(\alpha, \beta) \; z=Z(\alpha, \beta) \qquad (3)$$

Most of the free curved surface used by the currently-applied CAD system is called a NURBS (non-uniform rational B-spline) surface, and is expressed by the following formula (4):

$$S(\alpha, \beta) = \frac{\sum_{i=0}^{m} \sum_{j=0}^{n} Nik(\alpha) Njk(\beta) Wij Pij}{\sum_{i=0}^{m} \sum_{j=0}^{n} Nik(\alpha) Njk(\beta) Wij} \qquad (4)$$

wherein:
  Nik ($\alpha$), Njk ($\beta$); so-called a B-spline function
  Wij; weight function,
  Pij; surface control point (position vector),
  m+1, n+1: the number of control points in directions $\alpha$ and $\beta$, the total number of control points being (m+1)×(n+1).

According to the prior art CAD method, as shown in FIG. 2, a rectangular coordinate system is used for the parameter plane ($\alpha$, $\beta$), and when defining a surface having a complex local shape, the number n×m of the control points are increased for example to 10×10, . . . , or 50×100 according to the level of complexity.

Moreover, the straight lines drawn parallel to the vertical axis and the horizontal axis in the parameter plane ($\alpha$, $\beta$) [that is, lines $\alpha$=0, $\alpha$=1, $\beta$=0 or $\beta$=1 (expressing the boundary of the surface in real-space), or lines expressed by a fixed value of $\alpha$ or a fixed value of $\beta$] is expressed by a higher function of parameters $\alpha$, $\beta$ in mapping space (real-space). For example, according to methods such as the cubic Bezier patch or Coons patch, these lines in the parameter plane ($\alpha$, $\beta$) are expressed by a cubic Bezier curve: cubic parametric curve. However, even according to this method, the mapped curve in real-space corresponding to a straight line (u=$\alpha$=$\beta$) that diagonally cuts the parameter plane ($\alpha$, $\beta$) expressed by $\alpha$=$\beta$ becomes a sextic function expressed by the sextic equation of the parameter (u).

It is possible to continuously define a plural number of surface to the horizontal and vertical directions using the curved surface expressed by such curved method, but it is not possible to bond plural surface diagonally. In other words, the cubic Bezier curved surface defined by a group of infinite cubic Bezier curved lines may look like a group of sextic Bezier curved lines, and it is impossible to share the cubic curve and the sextic curve as the boundary between surfaces. Therefore, such conditions provide an extremely strict restriction to the creation of graphics.

Generally, the definition of the interior of a surface is not clear from a surface expressed with boundary lines. There are cases where a cross-sectional line (diagram) cutting the surface with a plane is used to evaluate the shape of the surface. However, coloring (shading) is a natural method to confirm the shape of a surface visually. Moreover, the virtual surface within the computer is realized by machining along the mathematically defined surface using an NC machine tool.

It is impossible to perform a consistent logical operation process according to the solid CAD method using various surfaces or by the conventional free curved surfaces defined by a complex formula. Therefore, as shown in FIG. 3, in the final step, the curved surface is resolved into small surface segments expressed by the minimum degree of freedom, or in other words, microplanes [normally, very small triangular surface elements] PT. All the curved surfaces of a solid is resolved into microplanes PT, and the operation process is carried out using a linear discrete process approximating this group of microplanes [called "polygon"] PP. The result of the operation is approximated by planes and lines. As explained, the currently applied CAD method utilizes a polygon PP where triangular surfaces PT formed by cutting portions of a plane defined by infinite expansion are connected so as to approximately express the curved surface, and a surface expression representing a wide space (such as NURBS surface) is used to control the alignment of the triangular microplanes PT.

Moreover, when shading is to be performed according to the conventional CAD method or CG (computer graphics), the color (shadow level) at each vertex of the polygon is computed, and continuous gradation process (glow shade, phon shade) is performed to the rest of the area. According to the conventional computer technology, it is not possible to evaluate the continuity of the surfaces visually. As explained, the linear-discrete approximation according to such CAD technology also has various problems for application to an NC process where a machine tool is controlled to cut out the desired shape.

The solid CAD method has the following characteristics:

(1) a graphic is created by Boolean operation superposing basic two-or two-and-a-half dimensional graphics (primitives) such as a cylinder, a cone or a hexahedron;

(2) a fillet surface must be formed to the area where two surfaces are superposed; however, such fillet process is irrational and not suited for designing;

(3) it is necessary according to the curved surface processing to define a substantially quadrilateral surface, and to adjust the shape of the surface through trimming; and (4) the operation processes above are approximation computations using polygonal approximation (linear-discrete approximation) applying linear algebra.

The advantage of the conventional method is that the process of designing can be reproduced from the beginning. However, the quantity of the data to be handled is grand, and the load for operation processes by the computer is too much, and there is no consistency in the handling of the surfaces.

SUMMARY OF THE INVENTION

Taking the above problems into consideration, the present invention applies a basic theory called "topology" to the three-dimensional CAD system, thereby providing a 3D CAD system capable of reducing the amount of data greatly, cutting down the load for operation processes of the computer, and providing consistency in the handling of the surfaces.

According to the basic characteristics of the present invention, there is provided a 3D-CAD system comprising means for setting a point element, and further setting a curved line (including a straight line) element, a curved surface (including a flat surface) element or a solid element each defined by linear, area or volume coordinate parameters as a basic graphic element; means for connecting a plurality of the basic graphic elements, thereby setting a basic graphic; and a means for deforming the basic graphic elements constituting the basic graphic while maintaining continuous differentiability thereof, thereby creating a desired solid graphic.

The above-mentioned basic graphic element is expressed by an nth degree equation (n is an integer of 2 or more) of the coordinate parameters; that is, the generated solid graphic is defined by a group of points having space coordinates expressed by a linear combination of same degree (N) monominals of the coordinate parameters.

Moreover, the point element has a three-dimensional position coordinate, the line element has data designating the point elements on both ends thereof (end pointers) and data representing the relative position of an intermediate control point (intermediate point control vector/line control vector), the surface element has data designating the line (border line/external line/periphery line) elements constituting said surface (border line/external line/periphery line pointer) and data representing the relative positional coordinates of inner-surface control points (inner control vectors), the solid element has data representing the data designating the surface (boundary surface/external surface/periphery surface) elements constituting the solid, and each of the point element, the line element and the surface element further has a reference counter (reference count/depending master number) showing how many other elements refer to said specific element.

Moreover, according to the main characteristics of the present invention, a recording medium for a three-dimensional CAD system is provided, to which is recorded a program comprising: a step of setting a point element, and further setting a line element, a surface element or a solid element each defined by linear, area or volume coordinate parameters as a basic graphic element; a step of connecting a plurality of basic graphic elements, thereby setting a basic graphic; and a step of deforming the basic graphic elements constituting the basic graphic while maintaining continuous differentiability thereof, thereby creating a desired solid graphic.

According to the present invention, line elements, surface elements or solid elements each defined by line, area or volume coordinate parameters are set as basic graphic elements (referred to as "element graphics" in the embodiment), and the basic graphic elements are mutually connected in order to form a compound graphic (referred to as "parts graphics" or "parts" in the embodiment) defined continuously by plural coordinate parameters, and these graphics are deformed so as to create the desired solid form. Accordingly, the surface element can express a wide region compared to the surface processing method of the conventional CAD system. Moreover, since patches are continuously connected to define a space graphic, that is, the present invention defines a continuously differentiable space graphic, and the patch can approximately express every surface, the surfaces can be handled consistently. Therefore, the present invention greatly reduces the data quantity for describing the graphic, and further reduces the load for operation processes of the computer.

Moreover, according to the invention, when the created solid graphic is defined by a group of points having space coordinates expressed by the cubic equation of the coordinate parameters, a sufficiently practical three-dimensional graphic expression is obtained without having to increase the number of operation more than necessary, enabling to control the surfaces while maintaining the continuous bond of tangents at the end of the surfaces.

According to the invention, the point elements have three-dimensional coordinate data, the line elements have end point pointers and intermediate control point data, the surface elements have boundary line pointers and inner-surface control point data, and the solid elements have data expressing the boundary surface pointers. Further, the point elements, the line elements and the surface elements have reference counter data. Therefore, when an element is to be deleted, the reference counter data is referred to so as to confirm whether or not this element is a constituent of other elements, thereby effectively determining whether or not to delete the element.

BRIEF DESCRIPTION OF THE DRAWINGS

FIG. 1 is a drawing showing the features of the graphics formed by a conventional three-dimensional CAD system;

FIG. 5 explains the point elements of the 3D-CAD system according to one embodiment of the present invention;

FIG. 6 explains the line (curved line) elements and the linear coordinate parameters of the 3D-CAD system according to one embodiment of the present invention;

FIG. 12 explains the polyhedron volume coordinate parameters of the 3D-CAD system according to one embodiment of the present invention;

FIG. 17 is the second portion of an example showing the actual graphic in the process of generating a solid graphic by the 3D-CAD system according to one embodiment of the present invention;

DETAILED DESCRIPTION OF PREFERRED EMBODIMENTS

The preferred embodiment of the present invention will now be explained in detail with reference to the accompanied drawings. The following is merely one example of the invention, and various modifications are possible within the scope of the present invention.

[Structure of Shape Model Data]

Figure 4:
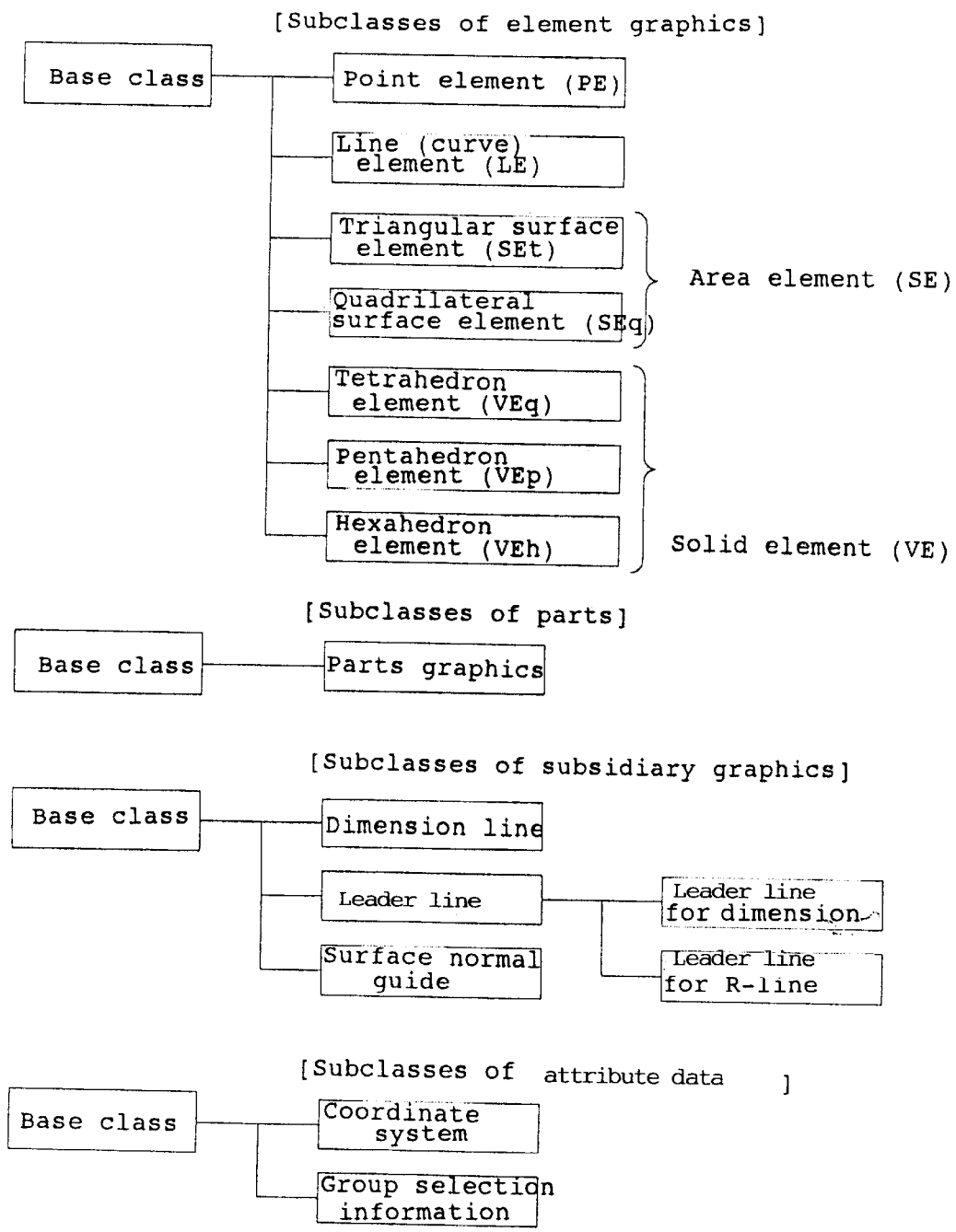
FIG. 4 shows the shape-model-data-class structure of the 3D-CAD system according to one embodiment of the present invention.

According to the 3D-CAD system of one embodiment of the present invention, as shown in FIG. 4, the shape model data are a group of objects having class hierarchy drived from the base class. The object groups derived from the base classes can be classified largely into three types: graphic data indicating graphics having a so-called shape [including parts graphic (parts) which is a collective of these graphic data]; attribute data having no shape; and cutter path used in an NC process included as one kind of the shape model data. Moreover, the graphic data can be classified into a primary shape graphic data constituting a shape model, and a subsidiary graphic data (dimension line etc.) accompanying the primary shape graphic data.

First of all, the shape graphic data comprises of elemental graphics (fundamental topology) including point element PE, line (curved line) element LE, surface element SE and solid element VE. The surface element SE can be classified for example into a triangular surface element (triangular patch) SEt and a quadrilateral surface element SEq. The solid element VE can be classified for example into a tetrahedron element VEq comprising four triangular surfaces, a pentahedron element VEp comprising two triangular surfaces and three quadrilateral surfaces, and a hexahedron element VEh comprising six quadrilateral surfaces. These basic graphic element groups do not express a model shape independently, but the shape model is formed of a parts graphic (hereinafter called "parts") composed of collected basic graphic element groups. The above-mentioned basic graphic elements constitute one element included in the parts.

Other than the element graphics such as points and lines, the parts can include data other than shapes, such as subsidiary graphics including dimension lines, or group selection information. Moreover, parts can be included in other parts. In other words, the parts can form a recursive hierarchy structure, and the whole shape model can be expressed by this hierarchy structure of the parts.

Moreover, the subsidiary graphic data includes for example a dimension line, a leader line accompanying the dimension line (leader line for dimension line, leader line for R line, etc.), and a normal guide for the surfaces. The attribute data includes coordinate systems necessary for expressing and controlling a graphic, and a graphic group selection information.

With comparison to the above-mentioned derived objects of the shape model data, the base class stores the basic attribute data common to all derived objects. The class definition of the base class includes for example the following basic attribute data: a "data type" identifying the data model of the object (the class to which it belongs); a pointer to itself; a master coordinate system data (master coordinate system pointer, master coordinate system I/O sequence No.), a master graphic information showing that a certain graphic is above another with a relative positional relationship (master graphic pointer, master graphic data type, master graphic I/O sequence No.); various status information including flags for controlling the display or various editing operation [selective attribute, display mode (display option), capability of movement, original/copy, display/non-display (flag), reference counter, positive data/negative data discrimination flag discriminating whether the graphic forms a bore or not (a range in the interior of the graphic forming a bore will not be colored during the rendering process)]; and an exterior file I/O information (I/O sequence No.).

The "reference counter" refers to the number of references from other model data, and if the value is 0, it means that the object is an independent object which is not referred to by any other objects. There are cases where plural objects refer to a certain object, in which case the value exceeds 2. The counter is referred to by other objects. For example, when graphics are composed (formation of a master-subordinate relationship), one is added to the counter every time the pointer of that object is assigned to the pointer variable of the graphic to be referred to. Moreover, when the reference is disconnected due to the division of the graphics (cancellation of master-subordinate relationship) (in other words, when the graphic is not referred to, or when the reference is changed to another object), one is taken away from the counter.

[Parts Graphic (Parts)]

As mentioned above, the shape model is expressed as a combination of parts, and the parts can form a recursive hierarchical structure to constitute a hierarchical model from relatively simple partial shapes to a complex integral shape. Moreover, the parts themselves are expressed as a combination of element graphics (basic topology) including point elements and line (curve) elements, surface elements and solid elements. The attribute data of the parts include for example the master parts information (the pointer of the master parts and the I/O sequence No.), the parts local coordinate system (parts local coordinate system, local coordinate system I/O sequence No.), the structure information of the parts (parts shape data block), parts name, and display control flags (coordinate system display flag, parts display flag).

The master parts information can be tracked to express the recursive hierarchical structure of the parts. Each part has its own local coordinate system, and maintains position, attitude and scale based on the local coordinate system of the master part to which the part depends. The shape element groups constituting each part, including the subordinate parts, is arranged in the local coordinate system of the part. Accordingly, the hierarchy of the part is the hierarchy of the coordinate system. A part having no master part is to be arranged in the world coordinate system. Moreover, the parts can each have a name in the form of a character string comprehensible to human, which improves the usefulness of the system.

Each part retains in the form of a list all of the element graphics group, the subsidiary graphics group and the subordinate parts group constituting each part, and also retains in the same form the data group other than graphics, such as the group selection information. The model data constituting each part includes for example an element graphic structure list of each element graphic type [point list, line (curve) list, surface (triangular, quadrilateral surface) list, solid (tetrahedron, pentahedron, hexahedron) list], subordinate parts list, subsidiary graphic list (dimension line list, leader line list), and group selection list, which are stored as lists under each category with the layer number and the like.

[Local Coordinate System]

The local coordinate system is a derivative class of the base class. For example, the following are defined: coordinate system transformation matrix (master coordinate system relative) [translation (x, y, z), rotation (rotary angle around each axes x, y, z)], axis (mesh) display control information (scale width of each axial direction, scale width perpendicular to each axis, length of each axis, the number of mesh of each axial direction, the number of mesh perpendicular to each axis), display control data (paint data retention area, prevention of screen flickering), and computation value used for display (world transformation matrix) [original point position vector, X axis (1,0,0) vector, Y axis (0,1,0) vector, Z axis (0,0,1) vector].

The transformation of the coordinate system is expressed by the original position (translation) on the master coordinate system, and the amount of rotation around each axis (X, Y, Z axes). Moreover, when displaying an object on the screen, the coordinate transformation from the local coordinate system P1 (x, y, z) to the world coordinate system Pw (X, Y, Z) is performed at once using the following equation (5) utilizing a world transformation matrix Tw computed in advance reflecting the hierarchy of the coordinate system:

$$Pw(X,Y,Z)=P1(x,y,z) \times Tw \tag{5}$$

[Group Selection Information]

The group selection information refers to the data for collecting the objects within the parts as a group based on some reason, and the objects belonging to a group can be retained as a collective. The data structure of a group selection information comprises, for example, the name of the group, and the list of the selected graphic I/O sequence number. The objects belonging to a group can be managed in the memory by providing a list of the pointer to each object. However, when the object group is stored in an external file, the pointer cannot be used, so the I/O sequence number of each object is stored as a list in the form of a character string, and when the data is read-in, the sequence number is converted into the pointer of the object group.

[Coordinate Parameter and Basic Graphic Elements (Element Graphic)]

According to the 3D CAD system of the present embodiment, the element graphics constituting the basic graphic elements (basic topology) can be largely classified into these groups: a point element PE which is a zero-dimensional element, a line (curve) element LE which is a one-dimensional element, a surface (curved surface) element SE which is a two-dimensional element such as a triangular surface or a quadrilateral surface, and a solid element VE which is a three-dimensional element such as a tetrahedron, pentahedron, or hexahedron. These element graphics are all defined as the derivative class of the base class, and will each take over the attribution of the base class and add thereto each unique attribution data. Moreover, the element graphic is defined by area coordinate parameters $\alpha$, $\beta$, $\gamma$, etc. More precisely, the line element LE, the surface element SE and the solid element VE are each defined by linear coordinate parameters $\alpha 1$, $\beta 1$, area coordinate parameters α2, β2, γ2 (,δ2 ...), and volume coordinate parameters α3, β3, γ3, δ3, ... and so on.

[1] Point Element PE

The essential data added to the point elements PE are the 3D coordinate value within the local coordinate system, the area coordinate value within the master graphic, and the relative offset from the master graphic, and the data structure of the point element PE includes for example the graphic shape data [3D coordinate value of the point, the area coordinate parameters of the master graphic, the offset length, the offset (deformation)], and the display/edit work area (paint data retention area, prevention of screen flickering).

The graphic acting as the master of a point element PE can be any of the following: another point element PE, a line element LE or a surface element SE. If the point element has no master graphic, the coordinate value P of the point element PE (x, y, z) within a three-dimensional space can be expressed by a vector Po as shown in FIG. 5 (1), and when the element is dependent to a master graphic, the coordinates can be computed by the following equation (6):

$$P(x, y, z) = Pp(\alpha, \beta, \ldots) + Po \quad (6)$$

In the equation, Pp (α, β, ...) refers to the three-dimensional space coordinates computed based on the area coordinate parameters (α, β, ...) of the point within the master graphic. That is, when the area coordinate value (α, β, ...) is moved in the master graphic, as shown in FIG. 5 (2), it means that the point element PE also moves along the master graphic by an offset of Po. Moreover, in a special case where the master graphic is another point element PE, Pp (α, β, ...) equals to the coordinates (x, y, z) of the master.

[2] Line Element LE

In the case of a line (curve) element LE, the data representing its shape include two end points of the line, the control vector corresponding to a tangent vector at the end point [line control vector, also called (intermediate) control point vector], and an offset vector of the control point. These data are used to represent the shape of the curved line by a given total nth degree equation (for example, cubic equation) having the area coordinates (α, β) as parameters. Here, there is no distinction between a straight line and a curved line, and a straight line is handled as a special case of a curved line. In the following, the line element LE is explained using especially symbols α1 and β1 as the area coordinate parameters α, β.

As shown in FIG. 6 (1), a linear line AB having a length "1" is divided into two line segments AL and LB, and the values representing each length α1 and β1 of the line segments LB and LA are used as the area coordinate parameters (accurately, the linear coordinate parameters), and the position vector P on the line element LE mapped in real-space (x, y, z) is represented by the following equation (7):

$$P = P(\alpha 1, \beta 1) \quad (7)$$

However, as the necessary condition, the relationship of the following equation (8) is always fulfilled:

$$1 - (\alpha 1 + \beta 1) = 0 \quad (8)$$

Therefore, if one parameter (for example, α1) is determined based on equation (8), the other parameter (for example, β1) is also determined (α1=1−β1, β1=1−α1).

Further, generally explaining, the linear line AB having a length value "1" is assumed to have a point Lo, and the area Sab of a triangle ΔLoAB having line AB as the base and a shape coefficient k1 is introduced to consider the linear coordinate parameter values represented by the following equation (9):

$$1 - (\alpha 1 + \beta 1) = k1 \cdot Sab \quad (9)$$

When the point Lo is approximated to linear AB along the normal of line AB and reaches point L, the area Sab of the triangle ΔLoAB having the line AB as base equals to 0, and the equation (8) is obtained from the equation (9).

The area coordinates (α1, β1) fulfills the following relationship:

$$\alpha 1 + \beta 1 = 1 \quad (10)$$

Simply stated, where point P is positioned on the line (curve) element LE relative to the end points PA and PB is considered within the area coordinate parameter space, and the ratio of the distance from each of the end points are represented. However, if point P is outside the line segment (arc), one of the two coordinates become negative. Moreover, the mapping of the area coordinates (α1, β1) to three-dimensional space coordinates P (x, y, z) is computed for example by a total cubic equation symmetric to the area coordinate parameters (α1, β1).

The position vector P on the linear element LE mapped to the real-space (x, y, z) corresponding to the area coordinate (α1, β1) is represented by the following equation (11) when described in the form of a cubic equation:

$$P = A10\ \alpha 1^3 + A11\ \beta 1^3 + A12\ \alpha 1^2\ \beta 1 + A13\ \alpha 1\ \beta 2^2 \quad (11)$$

Here, the coefficient vectors A10–A13 are computed based on a total of four control variables; two end point vectors (end points PA, PB), and two (line) control vectors (intermediate control point vectors) Tab, Tba. The coefficient vectors A10 and A11 are set as A10=real-space coordinate value of end point PA, and A11=real-space coordinate value of end point PB. As for A12 and A13, for example, it is best to set A12=3×(A10+Tab) and A13=3×(A11+Tba).

When the coefficient vectors A10 through A13 are set as above, as shown in FIG. 6 (1), the point Pab of parameter values α1=2/3, β1=1/3, and point Pba of parameter values α1=1/3, β2=2/3 on the line element PE are controled by vectors Tab and Tba and two end points PA, PB. The control vectors Tab and Tba, according to this setting example, is 1/3 times the tangent vectors Tβa, Tαb of the line element LE at end points PA and PB. Here, the tangent vector Tβa is dP/dβ1 when α1=1, β1=0, and the tangent vector Tαb is dP/dα1 when α1=0, β1=1.

If the line is straight, then:

$$Tab = (A11 - A10)/3$$

$$Tba = (A10 - A11)/3$$

and therefore:

$$A12 = 2.0 \times A10 + A11$$

$$A13 = A10 + 2.0 \times A11$$

When the above is directly applied to the above mapping equation (11):

$$P(x, y, z) = A10\ \alpha 1 + A11(a - \alpha 1)$$

or $$P(x, y, z) = A10(1 - \beta 1) + A11\ \beta 1$$

thereby obtaining an ordinary linear representation.

According to a more detailed explanation of this mapping, since $(\alpha 1, \beta 1)=(1, 0)$, then $P(x, y, z)=A10$, and since $(\alpha 1, \beta 1)=(0, 1)$, then $P(x, y, z)=A11$, the line element LE is known to go through end points PA and PB each represented by coefficient vectors A10 and A11. Moreover, when the mapping equation (11) is differentiated by parameter $\beta 1$, the following equation (12) is obtained related to the tangent vector $T\beta=dP/d\beta 1$ on the line element LE extended from point PA to point PB:

$$T\beta = -3 \times \alpha^2\ A10 + \\ 3\times(\alpha^2 - 2\times\alpha 1\beta 1)\ (A10+\text{Tab}) - \\ 3\times(\beta^2 - 2\times\beta 1\alpha 1)\ (A11+\text{Tba}) + \\ 3\times\beta^2\ A11 \qquad (12)$$

The tangent vector $T\beta a$ of the line element LE at end point PA is obtained by applying $(\alpha 1, \beta 1)=(1, 0)$ to the above equation (12):

$$T\beta a = 3 \times Tab$$

Further, the tangent vector $T\alpha b$ of the line element LE at end point PB is similarly obtained by setting $(\alpha 1, \beta 1)=(0, 1)$ for tangent vector $T\alpha=dP/d\alpha 1$ on the line element LE extended from point PB to point PA:

$$T\alpha b = 3 \times Tba$$

Accordingly, vectors $T\beta a$ and $T\alpha b$ are three times the value of control vectors Tab or Tba.

In other words, when the line element LE is deformed while maintaining tangent continuity at end point PA, the end point vector A11 and control vector Tba at end point PB can be changed arbitrarily, and when the line element LE is deformed while maintaining tangent continuity at end point PB, the end point vector A10 and the control vector Tab at end point PA can be changed arbitrarily. Further, the curvature vector at end point PA and end point PB can each be obtained by applying either $(\alpha 1, \beta 1)=(1, 0)$ or $(0, 1)$ to curvature vector equation $dP^2/d\beta 1^2$ or $dP^2/d\alpha 1^2$. If the line element LE is to be deformed while also maintaining the curvature continuity at end point PA or end point PB, either only the end point vector A11 of the end point PB or only the end point vector A10 of the end point PA can be changed.

Moreover, other than the above-mentioned graphic shape data [two end points of the line, linearization flag, control point vector, control point offset (deformation)], the data structure of the line element LE includes the number of division for metric computation, the control vector selection flag for each control vectors, a work area for display/edit (paint data retention area, prevention of screen flickering) end point I/O sequence number, and so on.

FIG. 6 (2) shows an image of continuing the two linear line elements LE1 and LE2 at a common end point PB by tangent continuity. When performing tangent continuity to two linear elements LE1 and LE2, the control vectors Tba and Tbc at end point PB should be set toward mutually opposite directions. Moreover, if the curvature must also be continued, the length |Tba| and |Tbc| of the control vectors Tba and Tbc should be equal.

[2] Surface Element SE

In the case of a surface element SE, the shape is represented by the following three data: lines (curves) defining the boundary of the surface (also called a boundary line, an outer periphery line, or a circumferential line); inner control vectors (inner-surface control vectors); and offset vectors for each control vectors (deformation). Using coefficient vectors determined based on these attribute values, the shape of the curved surface is represented by a given nth degree equation (for example, a cubic equation) using area coordinates ($\alpha, \beta, \gamma, \ldots$) as parameters.

The data structure of the surface element SE actually includes for each surface element (triangular surface, quadrilateral surface) a graphic shape data [n vertexes of the surface ($n=3, 4, \ldots$), n boundary lines (curves) of the surface, inner control point vectors] which are explained in detail under the paragraph of the triangular surface element (triangular patch) SEt or the quadrilateral surface element (quadrilateral patch) SEq; the number of division for metric computation; control point offset (deformation); inner control point selection flag; color pallet number; minus patch (bore display) data (front/rear distance of z buffer depth, etc.); work area for display/edit (paint data retention area, prevention of screen flickering), vertex and boundary line I/O sequence number; and so on. The n number of vertexes of the surface element SE are included as data, but these are data representing the end points of the boundary lines of the surface element SE. These vertex data are arranged considering the connection between the boundary lines, and each vertex is the end point and the crossing point of any two boundary lines.

Moreover, as for the surface element SE, an arbitrary number of polygonal (n-gon) area coordinate parameters $\alpha, \beta, \gamma, \ldots$ can be used, but especially, the triangular surface element SEt and the quadrilateral surface element SEq are frequently used. Heretofore, each surface element SE is explained using symbols $\alpha 2, \beta 2, \gamma 2$, especially for the area coordinate parameters $\alpha, \beta, \gamma, \ldots$ (A) Triangular surface element (triangular patch) SEt: In a triangular surface element SEt, there are three data representing its shape, which are the three lines (curved lines) defining the boundary of the surface, the inner control point vector, and the control point offset (deformation). The coefficient vectors determined by these attribute data are used to represent the triangular curved surface shape (for example) by a given cubic equation using the area coordinates ($\alpha 2, \beta 2, \gamma 2$) as parameters.

Figure 7:
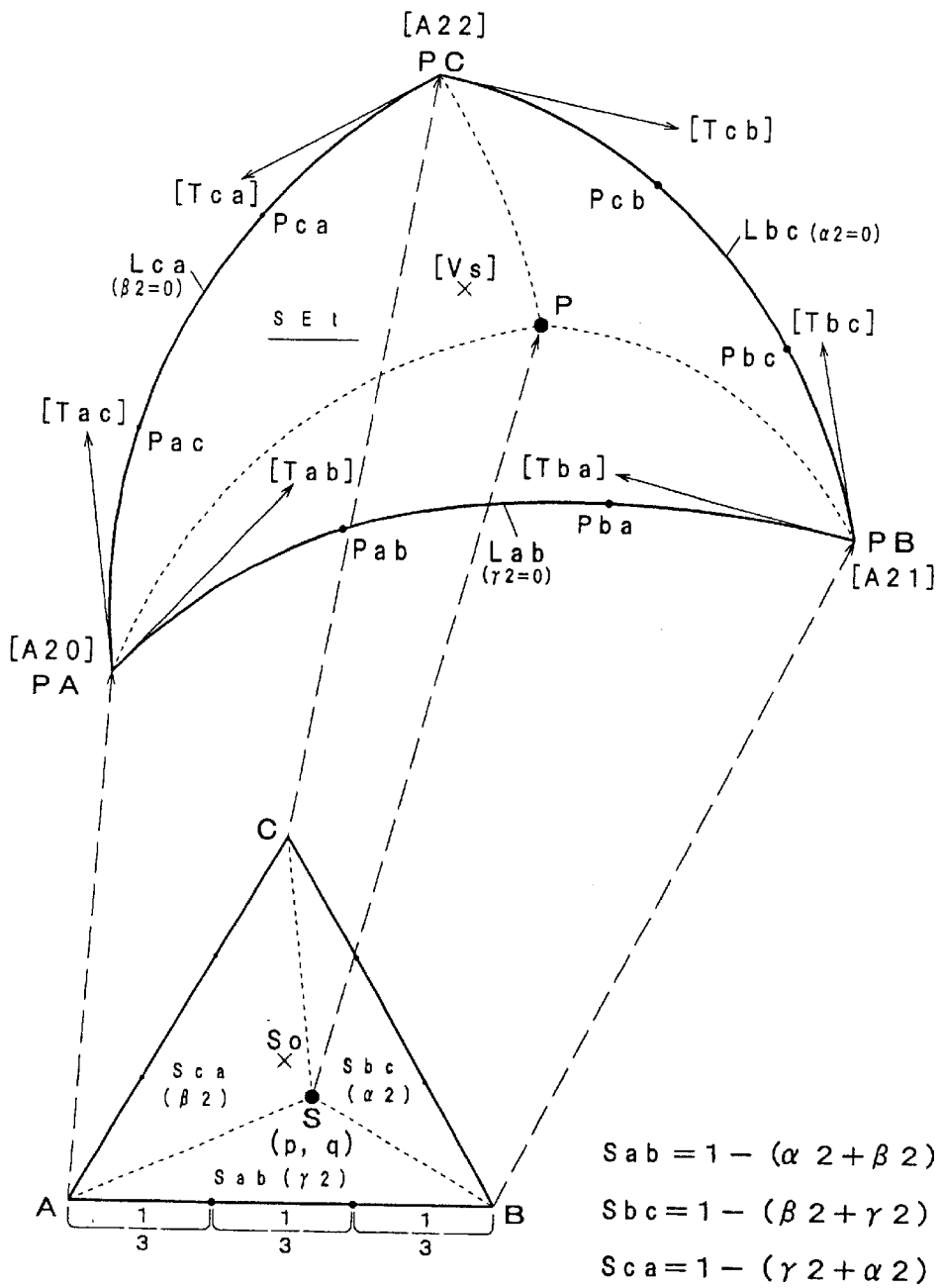
FIG. 7 shows the triangular area coordinate parameter plane and the mapped curve of the 3D-CAD system according to one embodiment of the present invention.

When using triangular ($n=3$) area coordinate parameters, as shown in FIG. 7, a point S is determined for an equilateral triangle $\triangle ABC$ having an area of "1", and the triangle is divided into small triangles $\triangle SAB, \triangle SBC$ and $\triangle SCA$. The areas Sab, Sbc and Sca of each of the small triangles $\triangle SAB, \triangle SBC$ and $\triangle SCA$ are set as follows:

$$Sab = 1-(\alpha 2+\beta 2) \qquad (13)$$
$$Sbc = 1-(\beta 2+\gamma 2) \qquad (14)$$
$$Sca = 1-(\gamma 2+\alpha 2) \qquad (15)$$

The values $\alpha 2, \beta 2$ and $\gamma 2$ are area coordinate values indirectly representing areas Sbc, Sca and Sab. The area coordinate values $\alpha 2, \beta 2$ and $\gamma 2$ are used as the triangular area coordinate parameters for point S, and the position vector P on the surface element SE mapped to real-space is represented by the following equation (16):

$$P=P(\alpha 2, \beta 2, \gamma 2) \qquad (16)$$

However, as the necessary condition, the relationship represented by following equation (17) is always fulfilled:

$$1-(\alpha 2+\beta 2+\gamma 2)=0 \qquad (17)$$

In an extreme example, when point S is positioned on vertex A, the values of each triangular area coordinate parameters are $\alpha2=1$, $\beta2=\gamma2=0$, when it is positioned on vertex B, they become $\alpha2=0$, $\beta2=1$, $\gamma2=0$, and when it is positioned on vertex C, they become $\alpha2=0$, $\beta2=0$, $\gamma2=1$. Accordingly, based on equation (17), when two of the three triangular area parameters are determined (for example, $\alpha2$ and $\beta2$), the remaining triangular area parameter (for example, $\gamma2$) is also determined.

As explained, the area coordinates ($\alpha2$, $\beta2$, $\gamma2$) representing a triangular surface has the following relationship:

$$\alpha2+\beta2+\gamma2=1 \tag{18}$$

The three vertexes PA, PB and PC correspond to the area coordinates ($\alpha2$, $\beta2$, $\gamma2$)=(1, 0, 0), (0, 1, 0) and (0, 0, 1). Further, simply expressed, the triangular surface element SEt has three boundary lines Lab, Lbc and Lca between each vertex PA, PB and PC, and as explained below, includes an inner-plane control vector (inner control point vector) Vs for controlling the shape of the area.

Since a surface is essentially two-dimensional, the area coordinates ($\alpha2$, $\beta2$, $\gamma2$) should actually be computed from two independent parameters (p, q), so the relationship between these parameters may be defined as follows:

$$\alpha2=1-\beta2-\gamma2$$
$$\beta2=p$$
$$\gamma2=q$$

According to this definition, the relationship of $\alpha+\beta+\gamma=1$ is fulfilled to an arbitrary value (p, q), and the coordinates ($\alpha2$, $\beta2$, $\gamma2$) are considered to represent a ratio of three quantities. Actually, as shown in FIG. 7, the coordinates represent the area ratio of three triangles when a given triangle $\Delta ABC$ is divided by an inner point S (p, q). Further, when the area coordinates ($\alpha2$, $\beta2$, $\gamma2$) are determined as above, the coordinates P (x, y, z) within a three-dimensional space corresponding to the parameters (p, q) can be computed based on a cubic equation of the area coordinates ($\alpha2$, $\beta2$, $\gamma2$) as explained below.

As shown in FIG. 7, the position vector P on a surface element SE mapped to real-space (x, y, z) corresponding to the triangular area coordinate ($\alpha2$, $\beta2$, $\gamma2$) is represented using the three area coordinate parameters $\alpha2$, $\beta2$, $\gamma2$ by the following equation (19) as the three-dimensional coordinate vector of the point P on the surface element SE, when represented by a cubic equation: (a symmetric equation for $\alpha2$, $\beta2$ and $\gamma2$)

$$P = A20\ \alpha2^3 + A21\ \beta2^3 + A22\ \gamma2^3 + \tag{19}$$
$$A23\ \alpha2^2\ \beta2 + A24\ \alpha2\ \beta2^2 +$$
$$A25\ \beta2^2\ \gamma2 + A26\ \beta2\ \gamma2^2 +$$
$$A27\ \gamma2^2\ \alpha2 + A28\ \gamma2\ \alpha2^2 +$$
$$A29\ \alpha2\ \beta2\ \gamma2$$

Here, the coefficient vectors A20 through A29 are computed based on a total of ten control variables, which are three vertex vectors (vertex=crossing point PA, PB and PC of boundary lines), six line control vectors (control vectors of boundary lines) Tab, Tba, Tbc, Tcb, Tca and Tac on six end points (ends of boundary lines), and one inner-surface control vector (inner control point vector) Vs. In other words, A20 through A22=real-space coordinate values of vertexes PA through PC, A23=3×(A20+Tab), A24=3×(A21+Tba), A25=3×(A21+Tbc), A26=3×(A22+Tcb), A27=3× (A22+Tca), A28=3×(A20+Tac), A29=2×(A20+A21+A22+Tab+Tba+Tbc+Tcb+Tca+Tac+3×Vs).

The above transformation (19) must agree to the mapping equation (11) of the line (curve) element PE on the boundary line of the triangular surface element SEt, but actually, the following is fulfilled for boundary line Lab:

$\alpha2+\beta2=1$, and $\gamma2=0$

When the above equation is assigned to equation (19), equation (11) is introduced. Similarly, when the variables for the other boundary lines Lbc and Lca are permuted cyclically, the same transformation is fulfilled. In other words, the mapping equation (19) represents a curved surface including the boundary lines Lab through Lca of the triangular surface element SEt. Moreover, if the area coordinate parameters ($\alpha2$, $\beta2$, $\gamma2$) are set to (1, 0, 0), (0, 1, 0) and (0, 0, 1) in equation (19), it is easily understood that the triangular surface passes vertexes PA, PB and PC represented by coefficient vectors A20–A22.

In FIG. 7, the intermediate point Pab of parameter values $\alpha2=2/3$, $\beta2=1/3$, $\gamma2=0$, and intermediate point Pba of parameter values $\alpha2=1/3$, $\beta2=2/3$, $\gamma2=0$ of the boundary line Lab between vertexes PA and PB are controled by vectors Tab and Tba and two end points PA, PB. The same can be said for intermediate points Pbc, Pcb; Pca, Pac of other boundary lines Lbc and Lca. Moreover, the inner-surface control vector Vs corresponds to the inner-surface control point mapping point So represented by symbol "x" in FIG. 7, where $\alpha2=1/3$, $\beta2=1/3$ and $\gamma2=1/3$, which controls the convexity/concavity of the triangular surface element SEt near the median point.

In equation (19), when ($\alpha2$, $\beta2$, $\gamma2$)=(1/3, 1/3, 1/3), the following is fulfilled:

$$P(x, y, z)=(1/3)(A20+A21+A22)+(5/27)(Tab+Tba+Tbc+Tcb+Tca+Tac)+(2/9)Vs \tag{20}$$

It is possible to understand how the convexity/concavity of the surface is influenced by the boundary lines and the inner control point vector Vs. Here, for example, when the boundary line Lab is a straight line, then:

$Tab=(A21-A20)/3$ $Tba=(A20-A21)/3$ and $Tab+Tba=0$

Similarly, if the other boundary lines Lbc and Lca are also straight, then:

$$P(x, y, z) = (1/3)\ (A20 + A21 + A22) + \tag{21}$$
$$(2/9)\ Vs$$

and the deviation from a true plane is 2/9 Vs. When the inner control point vector Vs is Vs=0, the surface is a plane, so in other words, the inner control point vector Vs controls the convexity/concavity of the surface near the median point.

[B] Quadrilateral surface (quadrilateral patch) element SEq: In the case of a quadrilateral surface element SEq, the data representing its shape are the four lines (curved lines) defining the boundary of the surface, the four inner control point vectors, and offset for each control point vectors (deformation). Using the coefficient vectors determined by these attribute values, the shape of the quadrilateral curved surface is represented (for example) by a given cubic equation using the area coordinates ($\alpha 2$, $\beta 2$, $\gamma 2$, $\delta 2$) as parameters.

Figure 8:
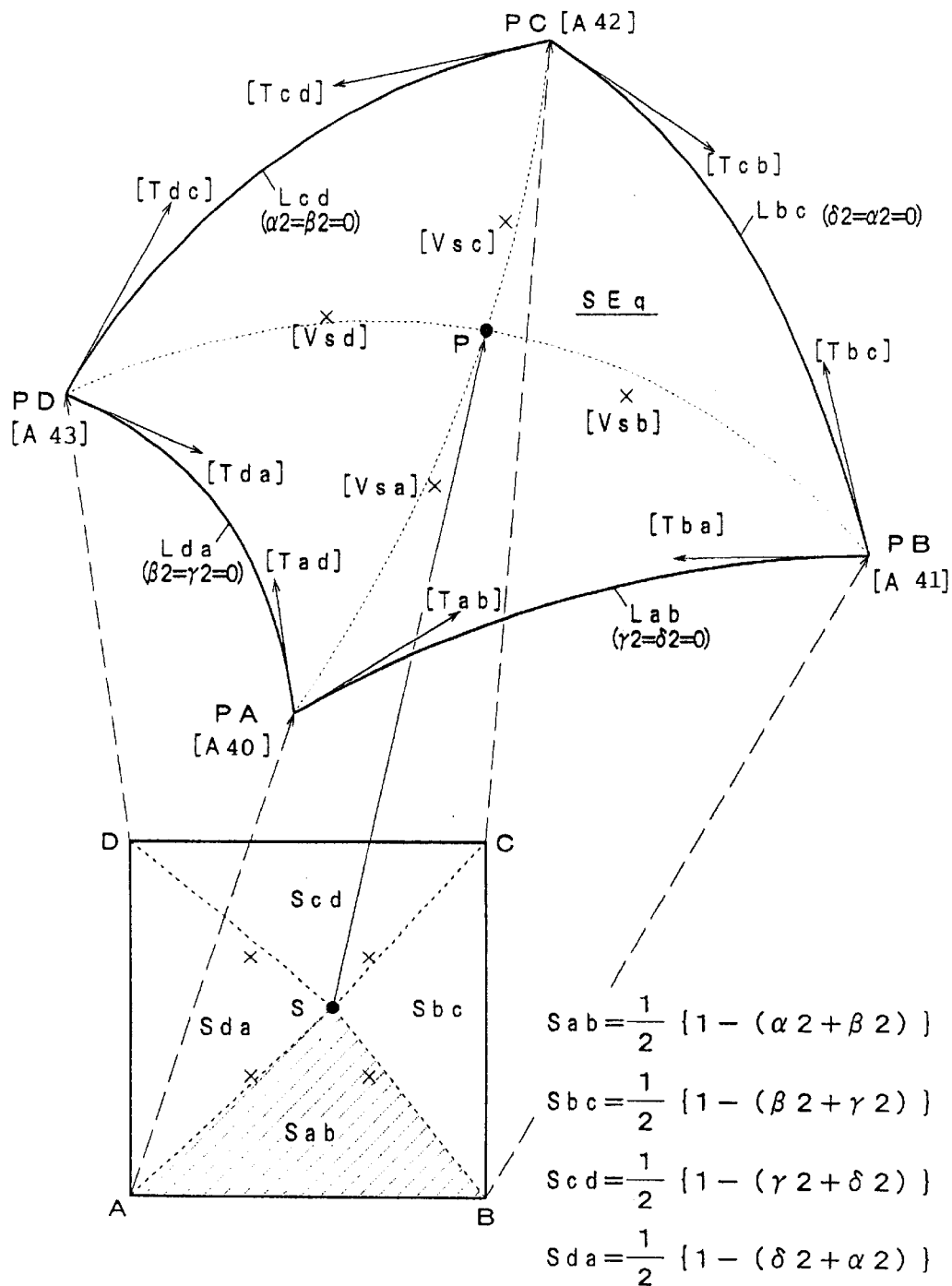
FIG. 8 shows the quadrilateral area coordinate parameter plane and the mapped curved surface of the 3D-CAD system according to one embodiment of the present invention.

When using quadrilateral (n=4) area coordinate parameters, as shown in FIG. 8, a point S is located in a square ABCE having edges each having a length of "1", or in other words, having an area of "1", and the square is divided into four small triangles $\Delta$Sab, Sbc, Scd and Sda. The areas of each triangle are represented by the following equations (22)–(25):

$$Sab = (1/2)\{1-(\alpha 2+\beta 2)\} \quad (22)$$

$$Sbc = (1/2)\{1-(\beta 2+\gamma 2)\} \quad (23)$$

$$Scd = (1/2)\{1-(\gamma 2+\delta 2)\} \quad (24)$$

$$Sda = (1/2)\{1-(\delta 2+\alpha 2)\} \quad (25)$$

The area coordinate parameters $\alpha 2$, $\beta 2$, $\gamma 2$ and $\delta 2$ are used for point S to define the surface element SE mapped onto real-space (x, y, z), and they can be handled as one curved surface element (curved surface quadrilateral patch) of a solid graphic.

Moreover, the quadrilateral area coordinate parameters $\alpha 2$, $\beta 2$, $\gamma 2$ and $\delta 2$ fulfill the relationship represented by the following equation (26):

$$1-(\alpha 2+\beta 2+\gamma 2+\delta 2)=0 \quad (26)$$

Further, if two of the quadrilateral area parameters (for example, $\alpha 2$ and $\beta 2$) are determined, then the position of the points which is a common vertex of the four triangles is determined, and so the value of the remaining quadrilateral area parameters (for example, $\gamma 2$ and $\delta 2$) are determined. Even further, by the linear transformation of the three area coordinates of a triangle ($\alpha 2$, $\beta 2$, $\gamma 2$) into four area coordinate system ($\alpha 2$, $\beta 2$, $\gamma 2$, $\delta 2$), the same surface element can be represented by a quadrilateral area coordinate system ($\alpha 2$, $\beta 2$, $\gamma 2$, $\delta 2$).

Figure 9:
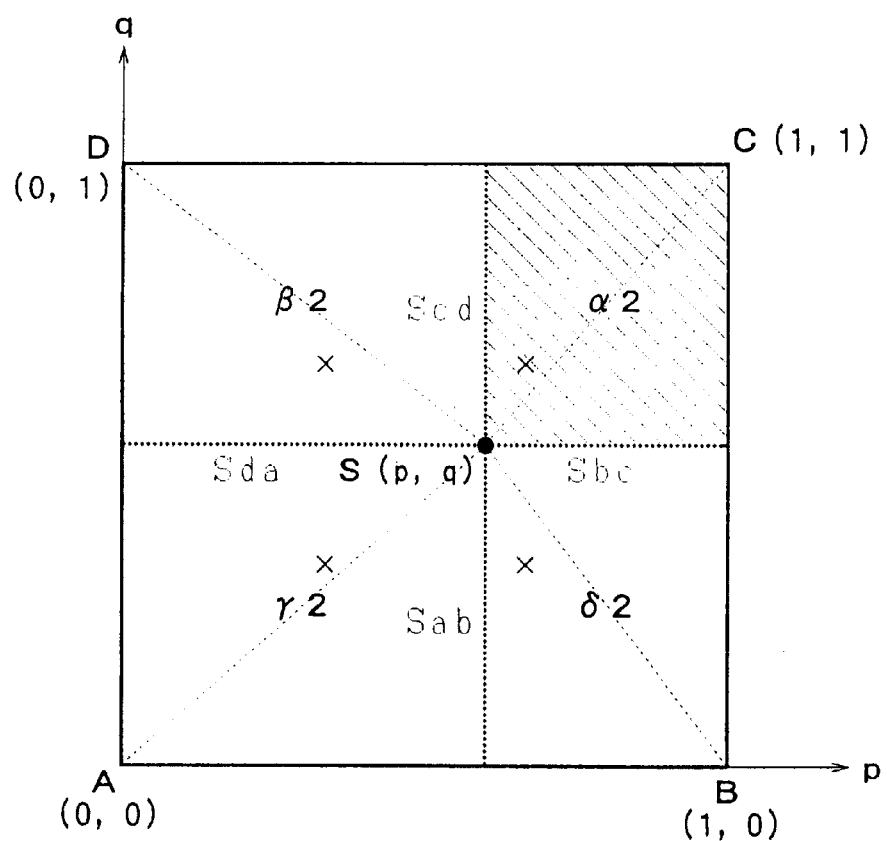
FIG. 9 explains the meaning of the quadrilateral area coordinate parameters of the 3D-CAD system according to one embodiment of the present invention.

Similar to the case with the triangular surface element SEt, since a surface is essentially two-dimensional, the quadrilateral area coordinates ($\alpha 2$, $\beta 2$, $\gamma 2$, $\delta 2$) can actually be computed based on two independent parameters (p, q), so as shown in FIG. 9, the relationship between these parameters can be defined as follows:

$$\alpha 2 = 1-p-q+\gamma 2$$

$$\beta 2 = p-\gamma 2$$

$$\gamma 2 = p \times q$$

$$\delta 2 = q-\gamma 2$$

According to this definition, the relationship of $\alpha 2+\beta 2+\gamma 2+\delta 2=1$ is fulfilled to an arbitrary value (p, q), so as explained in the case of the triangular surface element SEt, the coordinates ($\alpha 2$, $\beta 2$, $\gamma 2$, $\delta 2$) are considered to represent a ratio of four quantities. Actually, as shown in FIG. 9, they correspond to each of the area (or area ratio) of the divided surfaces when the square ABCD having a unit length is divided by a two-dimensional rectangular coordinate (p, q) on the square ABCD. Further, the mapping of the quadrilateral area coordinates ($\alpha 2$, $\beta 2$, $\gamma 2$, $\delta 2$) to the three-dimensional space coordinates P (x, y, z) is carried out using a cubic equation symmetric to the area coordinates ($\alpha 2$, $\beta 2$, $\gamma 2$, $\delta 2$).

As shown in FIG. 8, the position vector P on a surface element SE mapped to real-space (x, y, z) corresponding to the quadrilateral area coordinate parameters ($\alpha 2$, $\beta 2$, $\gamma 2$, $\delta 2$) is represented using the cubic equation (27) similar to equations (11) and (19) of the line (curve) elements LE or triangular surface elements SEt. The complexity of the surface corresponds to a surface defined by n×m=4×4 control points of a NURBS curved surface:

$$\begin{aligned}P = {} & A40\ \alpha 2^3 + A41\ \beta 2^3 + A42\ \gamma 2^3 + A43\ \delta 2^3 + \\ & A44\ \alpha 2^2\ \beta 2 + A45\ \alpha 2\ \beta 2^2 + \\ & A46\ \beta 2^2\ \gamma 2 + A47\ \beta 2\ \gamma 2^2 + \\ & A48\ \gamma 2^2\ \delta 2 + A49\ \gamma 2\ \delta 2^2 + \\ & A50\ \delta 2^2\ \alpha 2 + A51\ \delta 2\ \alpha 2^2 + \\ & A52\ \delta 2\ \alpha 2\ \beta 2 + A53\ \alpha 2\ \beta 2\ \gamma 2 + \\ & A54\ \beta 2\ \gamma 2\ \delta 2 + A55\ \gamma 2\ \delta 2\ \alpha 2 \end{aligned} \quad (27)$$

Here, the coefficient vectors A50 through A55 are computed based on a total of 16 control variables, which are four vertex vectors (vertex=crossing point PA, PB, PC and PD of boundary lines), eight line control vectors Tab, Tba, Tbc, Tcb, Tcd, Tdc, Tda, and Tad (each control vectors of boundary lines), and four inner-surface control vectors Vsa, Vsb, Vsc and Vsd. In other words, A40 through A43=real-space coordinate values of vertexes PA through PD, A44= 3×(A40+Tab), A45=3×(A41+Tba), A46=3×(A41+Tbc), A47=3×(A42+Tcb), A48=3×(A42+Tcd), A49=3×(A43+Tdc), A50=3×(A43+Tda), A51=3×(A40+Tad), A52=9× (A40+Tab+Tad+Vsa), A53=9×(A41+Tbc+Tba+Vsb), A54= 9×(A42+Tcd+Tcb+Vsc), and A55=9×(A43+Tda+Tdc+Vsd).

The above transformation (27) must agree to the transformation (11) of the line segment from the point of continuity, and, the following is fulfilled for boundary line Lab:

$$\alpha 2+\beta 2=1, \text{ and } \gamma 2=\delta 2=0$$

When the above equation is assigned to equation (27), equation (11) is actually introduced. Similarly, when the variables for the other boundary lines Lbc through Lda are permuted cyclically, the same transformation is fulfilled. In other words, the mapping equation represents a curved surface including the boundary lines Lab–Lda of the quadrilateral surface element SEq. Moreover, if the parameters ($\alpha 2$, $\beta 2$, $\gamma 2$, $\delta 2$) are set to (1, 0, 0, 0), (0, 1, 0, 0), (0, 0, 1, 0) and (0, 0, 0, 1) in equation (27), the coefficient vectors A40–A43 are obtained respectively, and it is easily understood that the quadrilateral surface passes vertexes PA through PD.

Further, the line control vectors Tab, Tba, Tbc, Tcb, Tcd, Tdc, Tda and Tad are similar to those explained in the triangular surface element SEt. As for the inner surface control vectors Vsa, Vsb, Vsc and Vsd, the quadrilateral area coordinate parameters represented by symbol "x" in FIG. 8 ($\alpha 2$, $\beta 2$, $\gamma 2$, $\delta 2$) each correspond to the inner surface control points that mapped points (4/9, 2/9, 1/9, 2/9) [p=1/3, q=1/3], (2/9, 4/9, 2/9, 1/9) [p=2/3, q=1/3], (1/9, 2/9, 4/9, 2/9) [p=2/3, q=2/3], (2/9, 1/9, 2/9, 4/9) [p=1/3, q=2/3], and mainly controls the convexity/concavity near these control points. Moreover, as a default value, Vsa=Vsb=Vsc=Vsd=0 can be used for the inner control point vectors Vsa, Vsb, Vsc and Vsd. This corresponds to the coons patch with high degree of approximation.

Figure 10:
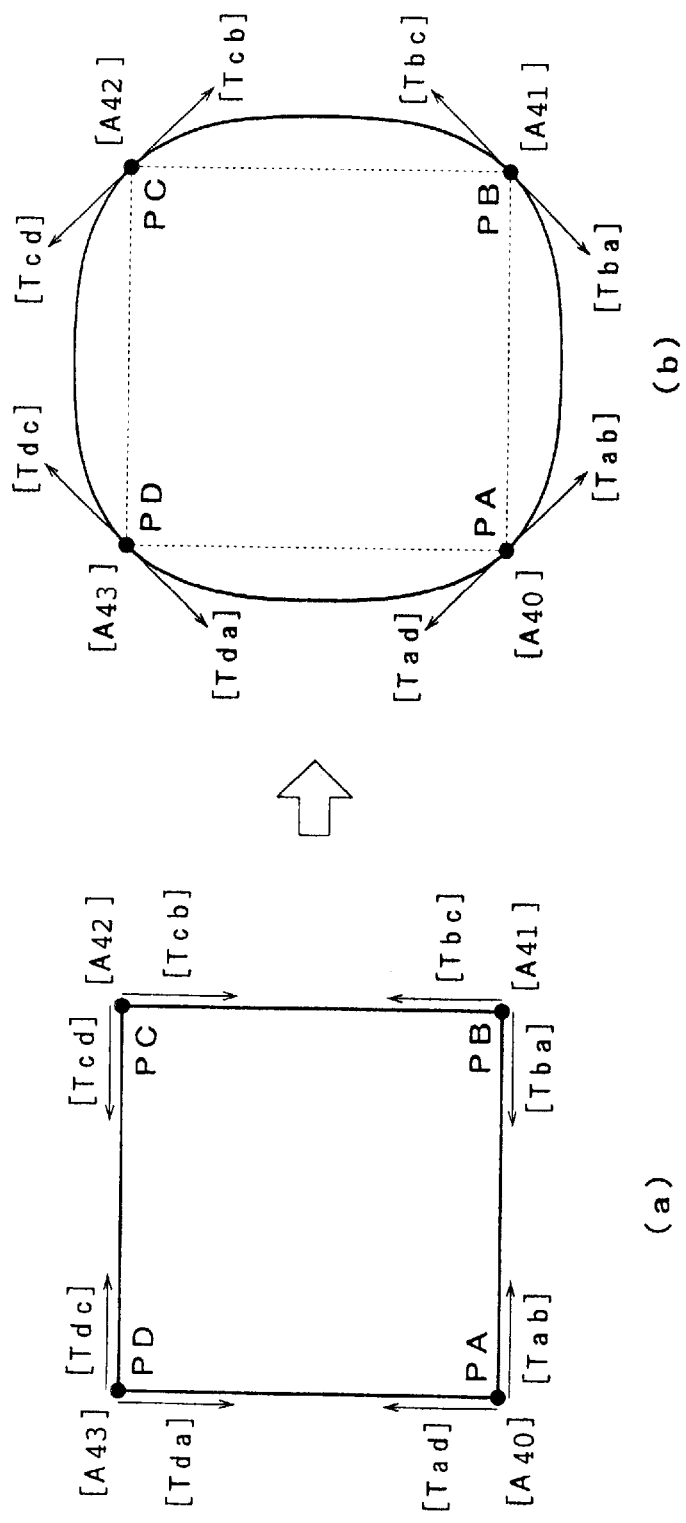
FIG. 10 shows one example of tangent continuation of the boundary lines of a quadrilateral surface element of the 3D-CAD system according to one embodiment of the present invention.

FIG. 10 shows the change in line control vectors Tab, Tba, Tbc, Tcb, Tcd, Tdc, Tda and Tad forming a circular graphic by tangent-continuity of square border lines Lab through Lda. In FIG. 10, similar to what is explained in the tangent continuity of line element LE in FIG. 6 (2), the control vectors Tad, Tab; Tba, Tbc; Tcb, Tcd; Tdc, Tda at end points PA–PD of border lines Lab–Lda are each set to have a matched direction with the border lines Lda, Lab; Lab, Lbc; Lbc, Lcd; Lcd, Lda adjacent thereto, with the vectors facing the opposite directions. Thereby, the border lines Lab–Lda are deformed from a square (a) to a circular-shape (b) where the tangents are continued at end points PA–PD.

Figure 11:
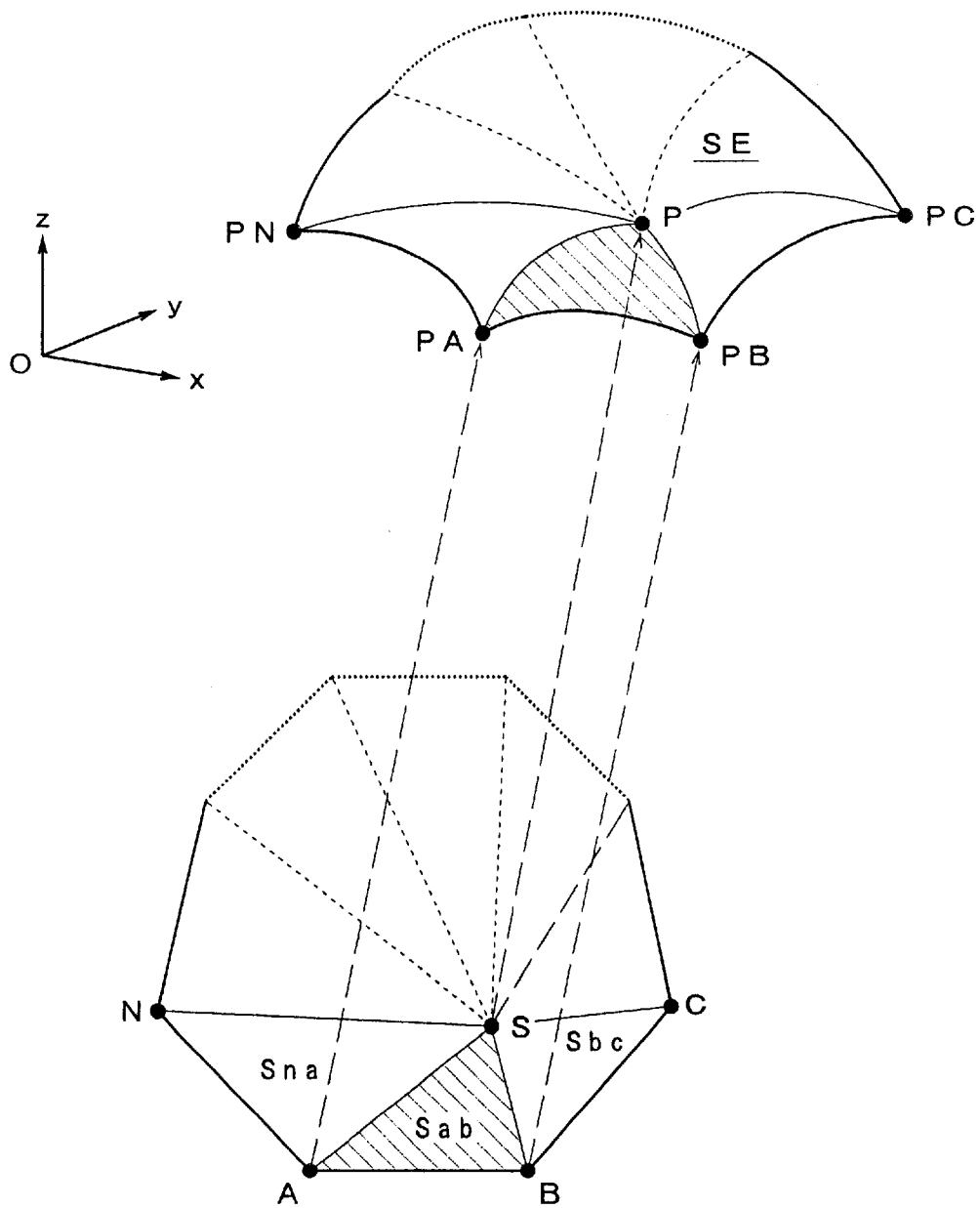
FIG. 11 generally explains the polygonal area coordinate parameters of the 3D-CAD system according to one embodiment of the present invention.

[C] N-gon surface element: Generally explained, as shown in FIG. 11 if the surface element SE defines an n-gon surface element SE by an n-gon area coordinate parameter utilizing a regular polygon (n-gon) ABC . . . N having an area of "1", the following equations (28) and (29) are fulfilled. If two triangular areas (for example, Sab and Sna) are determined, then all the area coordinate parameters can be determined:

$$P = P(\alpha 2, \beta 2, \gamma 2, \ldots) \tag{28}$$

$$1 - (\alpha 2 + \beta 2 + \gamma 2 + \ldots + \ldots) = 0 \tag{29}$$

Equation (29) is derived from the relationship of the following equations (30)–(32):

$$1 - (\alpha 2 + \beta 2) = k2 \, Sab$$

$$1 - (\beta 2 + \gamma 2) = k2 \, Sbc$$

$$1 - (\gamma 2 + \delta 2) = k2 \, Scd$$

. . .

$$1 - (\nu 2 + \alpha 2) = k2 \, Sna \tag{30}$$

$$Sab + Sbc + Scd + \ldots + Sna = 1 \tag{31}$$

$$K2 = n - 2 \tag{32}$$

Wherein, Sab, Sbc, Scd, . . . , Sna are areas of small triangles ΔSAB SBC, SCD, . . . , SNA formed above edges AN, BC, CD, . . . , NA. The shape coefficient k2 is set as follows: k2=1 when the shape in a triangle ABC (n=3), and k2=2 when the shape is a quadrangle ABCD (n=4).

[3] Solid Element VE

In a solid element VE, generally a point V is located in a regular n-hedron having a volume "1", and based on the volume of each pyramid Va, Vb, Vc, . . . , Vn having the point V as a common vertex and each polygonal surface as bottom, the volume coordinate parameter values ($\alpha 3$, $\beta 3$, $\gamma 3$, . . . , v3) of the polyhedron (n-hedron) is determined, based on which the solid element VE is defined. In this case, the following equations (33) and (34) are formed, and the values of the polyhedron volume coordinate parameters (for example, $\alpha 3$, $\beta 3$, $\gamma 3$, . . . , v3) are determined:

$$P = P(\alpha 3, \beta 3, \gamma 3, \ldots, v3) \tag{33}$$

$$1 - (\alpha 3 + \beta 3 + \gamma 3 + \ldots + v3) = 0 \tag{34}$$

Equation (34) is derived from the relationship of the following equations (35) through (37):

$$1 - (\alpha 3 + \beta 3 + \gamma 3 + \ldots) = k3 \cdot Va$$

$$1 - (\beta 3 + \gamma 3 + \ldots + \ldots) = k3 \cdot Vb$$

$$1 - (\gamma 3 + \ldots + \ldots + \ldots) = k3 \cdot Vc$$

. . .

$$1 - (\ldots + \ldots + v3 + \alpha 3) = k3 \cdot Vn \tag{35}$$

$$Va + Vb + Vc + \ldots + Vn = 1 \tag{36}$$

$$K3 = n - 3 \tag{37}$$

Va, Vb, Vc, . . . , Vn refer to the volume of the pyramids existing above each polygonal surfaces AB . . . , BC . . . , . . . , and the shape coefficient k3 is set to k3=1 when the shape is a regular tetrahedron (n=4), based on which the tetrahedron element VEq can be defined. Moreover, in the case of a regular hexahedron ABCDEFGH (n=6) as shown in FIG. 12 (1), k3 equals 3, and based on which the hexahedron VEh can be defined. The position vector P ($\alpha 3$ $\beta 3$, $\gamma 3$, . . . , v3) inside the solid element VE mapped onto real-space (x, y, z) corresponding to this polyhedron (n-hedron) volume coordinate parameters can be represented by a cubic equation similar to equations (19) and (27). Moreover, it can be confirmed that the boundary line (edge line) of tetrahedron element VEq and the hexahedron element VEh matches equation (11), and that the boundary surface matches equations (11) and (27).

For example as shown in FIG. 12 (2), in the hexahedron element VEh, the eight hexahedron volume coordinate parameters $\alpha 3$, $\beta 3$, $\gamma 3$, $\delta 3$, $\epsilon 3$, $\zeta 3$, $\eta 3$, $\theta 3$ refers to the volume of eight small rectangular parallelepipeds (end points A–H each correspond to what is opposite thereto. For example, parameter $\alpha 3$ corresponds to the small rectangular parallelepiped shown by oblique lines opposed to end point A) obtained by dividing a regular hexahedron ABCDEFGH having a volume "1" by an inner point V (p, q, r) (dividing the hexahedron by surfaces passing inner point V and parallel to p, q and r axes), the parameters having the following relationship:

$$\alpha 3 + \beta 3 + \gamma 3 + \delta 3 + \epsilon 3 + \zeta 3 + \eta 3 + \theta 3 = 1 \tag{38}$$

The mapping equation as disclosed in following equation (39) is obtained for the diagonals of inner point V (p, q, r) of the regular hexahedron:

$$\begin{aligned}
P = & A60\alpha 3^3 + A61\beta 3^3 + A62\gamma 3^3 + A63\delta 3^3 + A64\epsilon 3^3 + \\
& A65\zeta 3^3 + A66\eta 3^3 + A67\theta 3^3 + A68\alpha 3^2 \beta 3 + \\
& A69\alpha 3\beta 3^2 + A70\beta 3^2 \gamma 3 + A71\beta 3\gamma 3^2 + \\
& A72\gamma 3^2 \delta 3 + A73\gamma 3\delta 3^2 + A74\delta 3^2 \alpha 3 + \\
& A75\delta 3\alpha 3^2 + A76\alpha 3^2 \epsilon 3 + A77\alpha 3\epsilon 3^2 + A78\epsilon 3^2 \zeta 3 + \\
& A79\epsilon 3\zeta 3^2 + A80\beta 3^2 \zeta 3 + A81\beta 3\zeta 3^2 + A82\zeta 3^2 \eta 3 + \\
& A83\zeta 3\eta 3^2 + A84\gamma 3^2 \eta 3 + A85\gamma 3\eta 3^2 + A86\eta 3^2 \theta 3 + \\
& A87\eta 3\theta 3^2 + A88\delta 3^2 \theta 3 + A89\delta 3\theta 3^2 + A90\theta 3^2 \delta 3 + \\
& A91\theta 3\delta 3^2 + A92\delta 3\alpha 3\beta 3 + A93\alpha 3\beta 3\gamma 3 + \\
& A94\beta 3\gamma 3\delta 3 + A95\gamma 3\delta 3\alpha 3 + A96\theta 3\epsilon 3\zeta 3 + \\
& A97\epsilon 3\zeta 3\eta 3 + A98\zeta 3\eta 3\theta 3 + A99\zeta 3\theta 3\epsilon 3 + \\
& AA0\epsilon 3\alpha 3\beta 3 + AA1\alpha 3\beta 3\zeta 3 + AA2\beta 3\zeta 3\epsilon 3 + \\
& AA3\zeta 3\epsilon 3\alpha 3 + AA4\zeta 3\beta 3\gamma 3 + AA5\beta 3\gamma 3\eta 3 + \\
& AA6\gamma 3\eta 3\zeta 3 + AA7\eta 3\zeta 3\beta 3 + AA8\eta 3\gamma 3\delta 3 + \\
& AA9\gamma 3\delta 3\theta 3 + AB0\delta 3\theta 3\eta 3 + AB1\theta 3\eta 3\gamma 3 + \\
& AB2\theta 3\delta 3\alpha 3 + AB3\delta 3\alpha 3\epsilon 3 + AB4\alpha 3\epsilon 3\theta 3 + \\
& AB5\epsilon 3\theta 3\delta 3 + AB6\beta 3\epsilon 3\delta 3 + AB7\alpha 3\zeta 3\gamma 3 + \\
& AB8\beta 3\eta 3\delta 3 + AB9\theta 3\alpha 3\gamma 3 + AC0\theta 3\alpha 3\zeta 3 + \\
& AC1\eta 3\beta 3\epsilon 3 + AC2\zeta 3\gamma 3\theta 3 + AC3\eta 3\epsilon 3\delta 3
\end{aligned} \tag{39}$$

Here, the coefficient vectors A60–AC3 are computed from the eight vertexes, the six boundary surfaces and the data related to the boundary surfaces forming the hexagon (a total of 64 control variables including vectors of each vertex, each line control vectors of each boundary line, and inner-surface control vectors), the details of which are omitted. Provisory, when r=0, that is, $\epsilon 3=\zeta 3=\eta 3=\theta 3=0$, it becomes identical to the quadrilateral area coordinates ABCD mentioned in the explanation of quadrilateral surface element SEq, and when this is applied to the mapping equation (39), the result matches the representation of the mapping equation (27) of the quadrilateral surface element SEq. Similar method can be used to confirm this for the other boundary surfaces. Accordingly, mapping equation (39) inludes the boundary surfaces of the hexahedron in its expression.

In practice, the inner point of solid element VE is often not necessary. It is easier to use surface elements SE to represent the surface of the solid element VE (tetrahedron VEq, pentahedron VEp, and hexahedron VEh), and it is sufficient. Accordingly, the data structure of a practical solid element VE explained hereinafter are actually equipped with the graphical shape data [vertex, boundary line (curve), boundary surface], the number of division for metric computation, control point offset (deformation), work area of display/edit (paint area retention area, prevention of screen flickering) I/O sequence number for vertex, boundary line and boundary surface and so on for each solid element (tetrahedron, pentahedron, hexahedron). It also includes as data the vertexes of the surface element SE, but these data express the end point of the boundary lines of the surface element SE. The vertex data are end points of each boundary line arranged considering the connection of the boundary surfaces, and each is the end point shared by two boundary lines and is also a cross point thereof.

[A] Tetrahedron element VEq: Tetrahedron element VEq is represented as a solid with four triangular surfaces bonded together, and the data for representing this shape is simply the data of the border surfaces of these four triangles. The data representing the shape includes the data of the border line and the vertexes formed by the border surfaces. These data are arranged considering the connection of the surfaces.

[B] Pentahedron element VEp: The pentahedron VEp is represented as a solid with two upper and lower triangular surfaces and three quadrilateral surfaces connected to these triangles. The data representing this shape has a total of five border surface data, and similar to the tetrahedron element VEq, includes data of the border lines and vertexes of the border surfaces.

[C] Hexahedron element VEh: The hexahedron element VEh is represented as a solid with two upper and lower quadrilateral surfaces and four quadrilateral surfaces connected to these upper and lower surfaces. The data representing this shape has a total of six border surface data, and similar to other solid elements VEq and VEp, includes data of the border lines and vertexes of the surfaces formed by the border surfaces.

According to one embodiment of the present invention, the representation of the line (curve) and the surface (curved surface) by an nth degree equation form (for example, cubic equation) using the area coordinate parameters can be used to describe the subordinate graphic relatively on the master graphic, and to define the subordinate graphic over the master graphic. According to one embodiment using the cubic equation form, the position vector P of each element mapped onto real-space (x, y, z) corresponding to these coordinate parameters (hereinafter uniformly noted by symbols $\alpha, \beta, \ldots$) are, similar to equations (11), (19) and (27), expressed by a cubic equation of coordinate parameters $\alpha, \beta, \gamma$, showing the sum of vector coefficients A1, A2, A3, . . . each multiplied to the cubic combination "$\alpha\alpha\alpha$", "$\alpha\alpha\beta$", "$\alpha\beta\beta$", . . . of coordinate parameters $\alpha, \beta$, and so on. In other words, the three-dimensional coordinate value of point P on the line element LE and the surface element SE can be represented by a cubic expression as shown in following equation (40), and the same equation can represent the three-dimensional coordinate value of point P within the solid element VE (see the equation (39)):

$$P=A1\alpha^3+A2\alpha^2\beta+A3\alpha\beta^2+\ldots \quad (40)$$

This kind of cubic expression is in the form of minimum order maintaining a relationship where the tangents on the end of the surfaces are connected while controlling the surfaces. When cubic expression is used, a sufficiently actual three-dimensional graphic representation is obtained without increasing the complexity of computation more than necessary. However, a higher-order function can be used to provide improved expression. If the degree of freedom of expression can be low without any need to strictly consider the conditions of tangent continuity, then a quadratic equation can be used for expression:

$$P=A1\alpha^2+A2\alpha\beta+A3\beta\gamma+\ldots \quad (41)$$

In the 3D-CAD system according to the present invention, coordinate parameters such as linear coordinate parameters or area coordinate parameters are used to map any straight line on an area coordinate parameter plane onto a real-space curved line having the same expression form, thus being released from limitations of the conventional CAD system, such as the sharing of Bezier cubic and sextic boudary. Therefore, the present invention is capable of providing a control function related to the continuity between various surfaces.

[Data Structures of Each Element Graphic]

According to the CAD system of the conventional art, the surfaces or lines bordering one another were in many cases defined twice, but in order for a solid, a surface or a line to be defined continuously, duplex definition of surfaces, lines or points bordering one another must be prevented. One method according to the present invention for solving the problem is to use pointers LP, SP and VP as shown in FIG. 13 to provide a hierarchical relationship to the data structure for expressing point elements PE, line elements LE, surface elements SE and solid elements VE.

Figure 13:
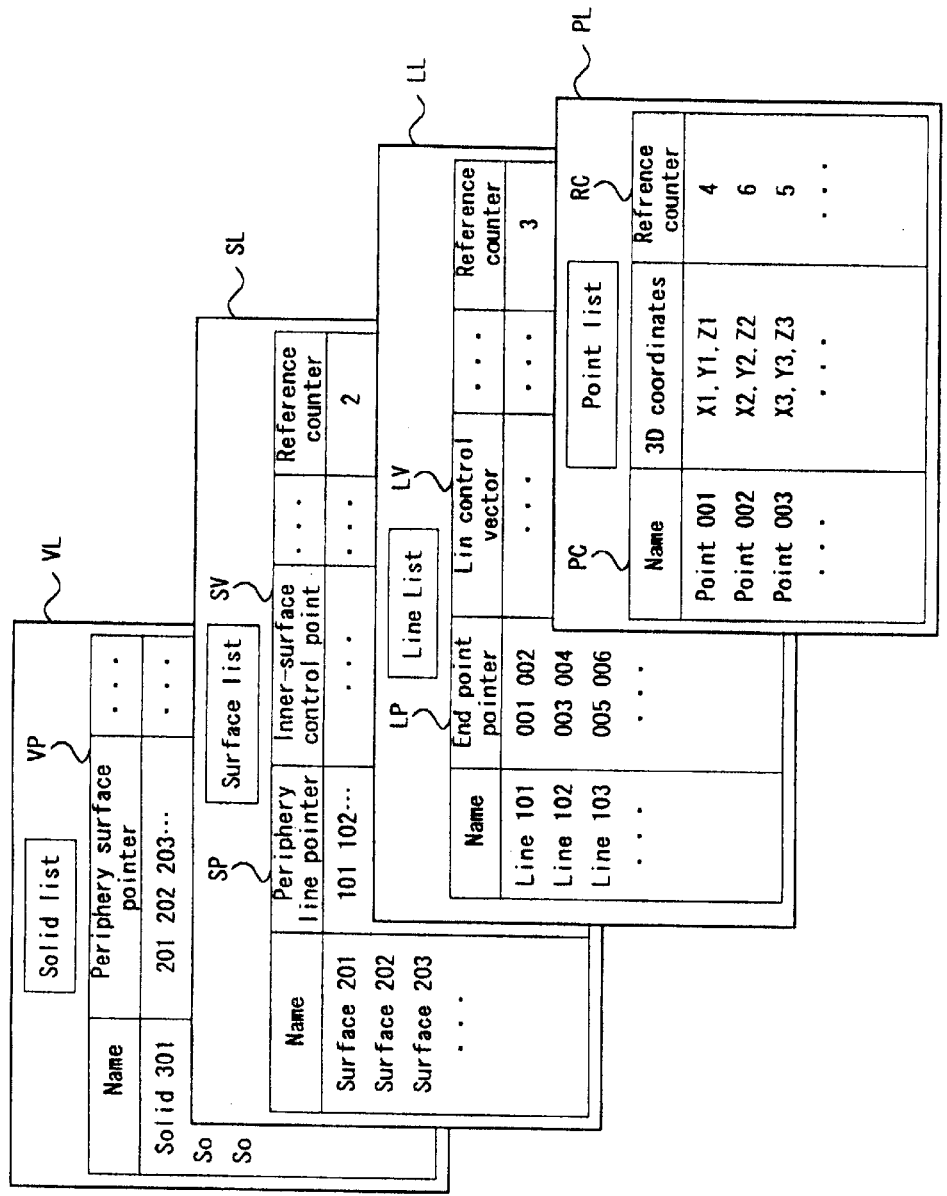
FIG. 13 shows the data structure of each basic graphic element of the 3D-CAD system according to one embodiment of the present invention.

In FIG. 13, the point list PL representing the point elements PE include for example coordinate value data PC representing the three-dimensional coordinate values (x, y, z) of each point element. The line list LL representing the line elements LE include end point pointers LP designating both end points of each line element LE, and line control vector data LV (relative definition) corresponding to the tangent vector at both ends of each line element LE (or an intermediate control point data representing the intermediate control point by relative coordinates). The surface list SL representing the surface elements SE include periphery line pointers SP designating the line elements constituting each surface element SE as border lines, or inner-surface control vectors SV of each surface element. The solid list VL representing solid elements VE include boundary surface pointers VP designating the surface elements constituting each solid element VE as border surfaces. A reference counter RC is provided to the point list PL, the line list LL and the surface list SL, which records the reference count data showing how many elements refer to the specific element.

Having the above mentioned data structure, when deleting element VE, SE or LE, it is necessary to confirm that the element to be deleted is not a component of another element, before the data of the related surface elements SE, the line elements LE or the point elements PE is deleted. Since according to one embodiment of the present invention, a reference counter RC is provided to the point list PL, the line list LL and the surface list SL, it is effectively determined whether or not an element can be deleted, by checking whether the reference counter of that element is "0" or not.

[System Outline]

Figure 14:
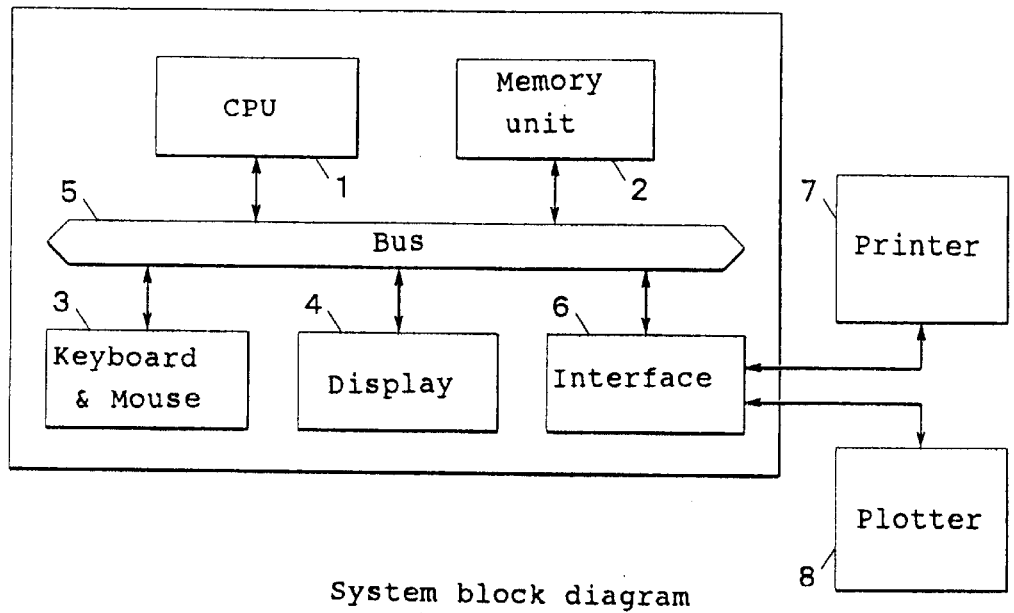
FIG. 14 is a block diagram showing the hardware structure example of the 3D-CAD system according to one embodiment of the present invention.

FIG. 14 is a block diagram showing the hardware structure example of the 3D-CAD system according to the present invention. In the example, the system comprises a CPU (central processing unit) 1, a memory unit 2, an input operation device 3 such as a keyboard and a mouse, a display device 4, and output devices 7 and 8 such as a printer, which are mutually connected through a bus 5. The CPU 1 controlling the whole system performs various controls based on a program, and especially mainly carries out the three-dimensional graphic modeling process according to the present invention. The memory unit 2 includes a ROM (read-only memory) storing a basic program, various graphic processing programs and fixed data/parameters, a RAM (random access memory) for temporarily storing various data, and external memory units such as a hard disc drive (HDD) and CD-ROM drive/FD (floppy-disk) drive. These external memory units store various graphic processing programs and various graphic data/parameters.

Further, the operator is capable of performing 3D-graphic processing by operating the input device 3 while visually checking various screens on display 4. In this example, an interface 6 is connected to the bus 5, and the three-dimensional graphics is printed out through a plotter 8 or a printer 7.

[Outline for Creating Graphic]

Figure 2:
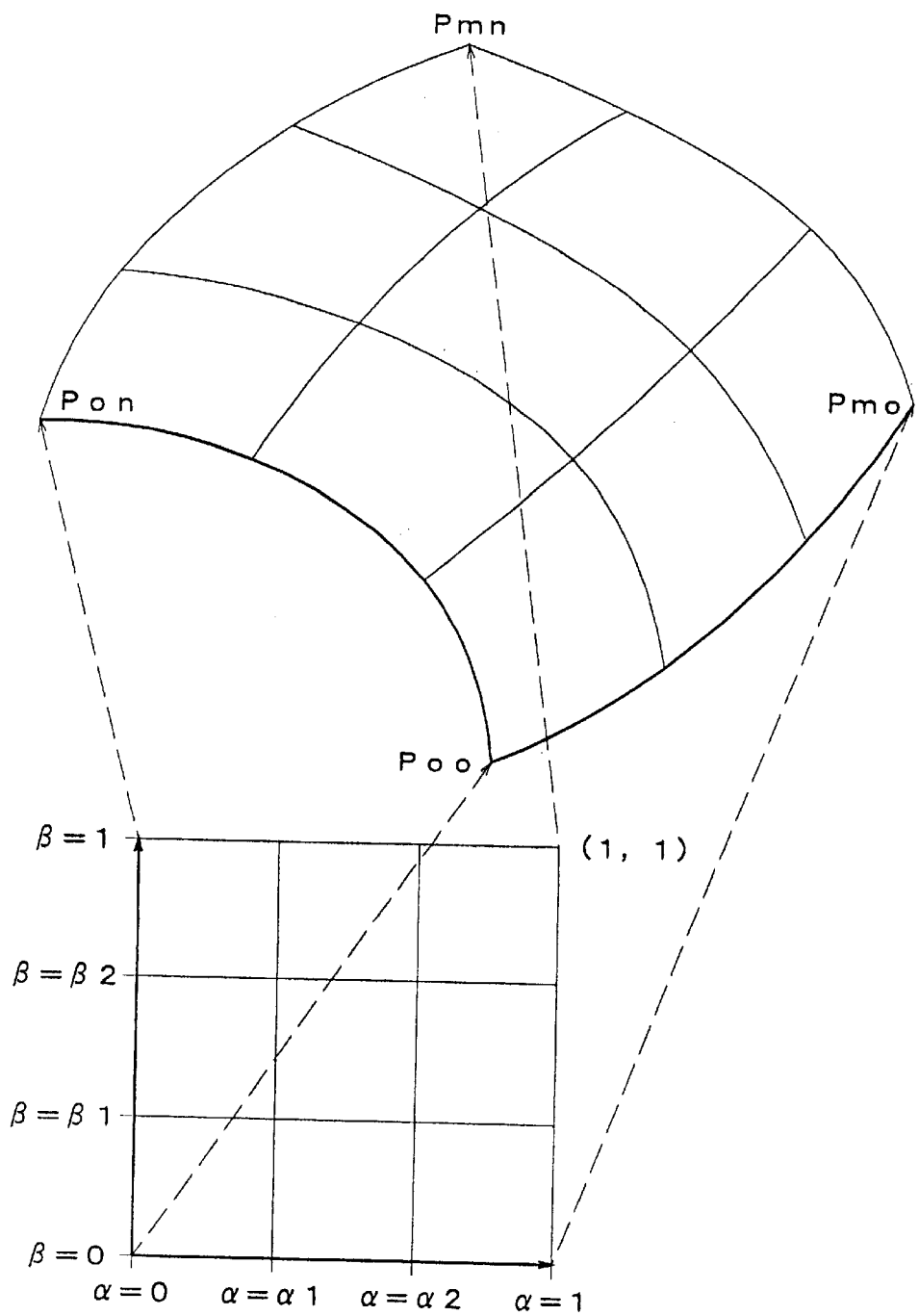
FIG. 2 shows the parameter plane and the mapped curved surface according to the conventional three-dimensional CAD system.
Figure 3:
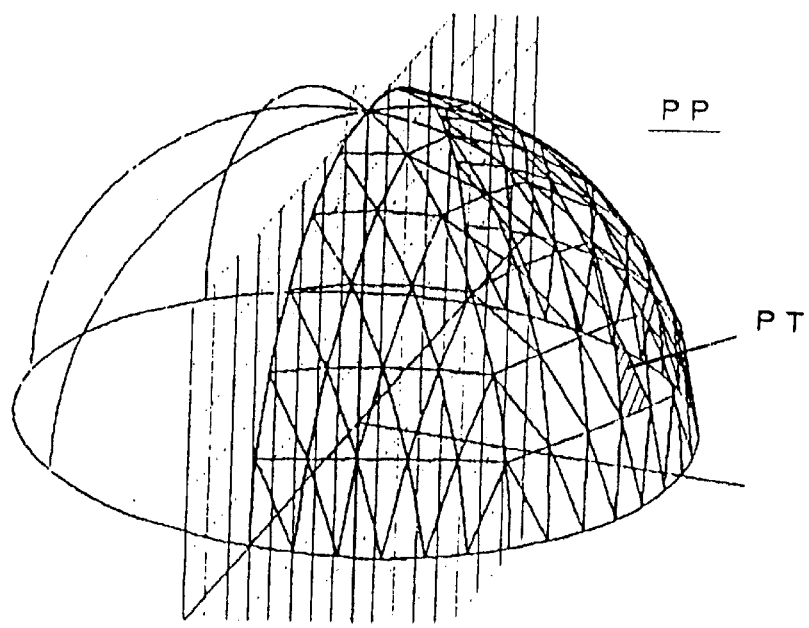
FIG. 3 shows the polygon approximation according to the conventional three-dimensional CAD system.
Figure 15:
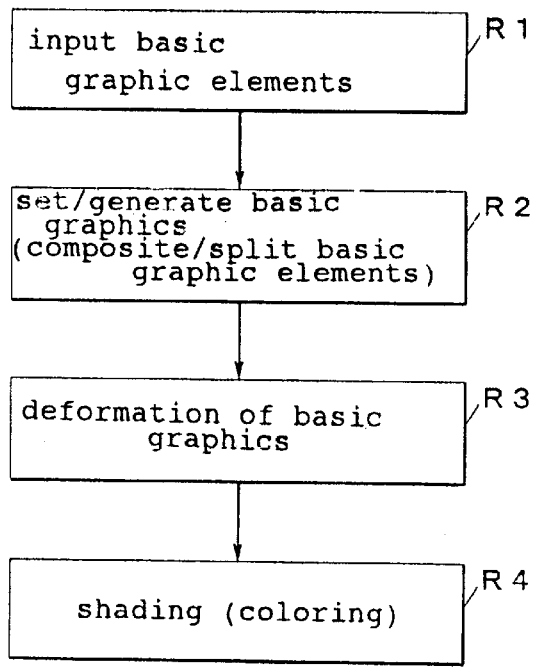
FIG. 15 is a graph showing one example of the process for constructing a solid graphic performed in the 3D-CAD system according to one embodiment of the present invention.
Figure 16:
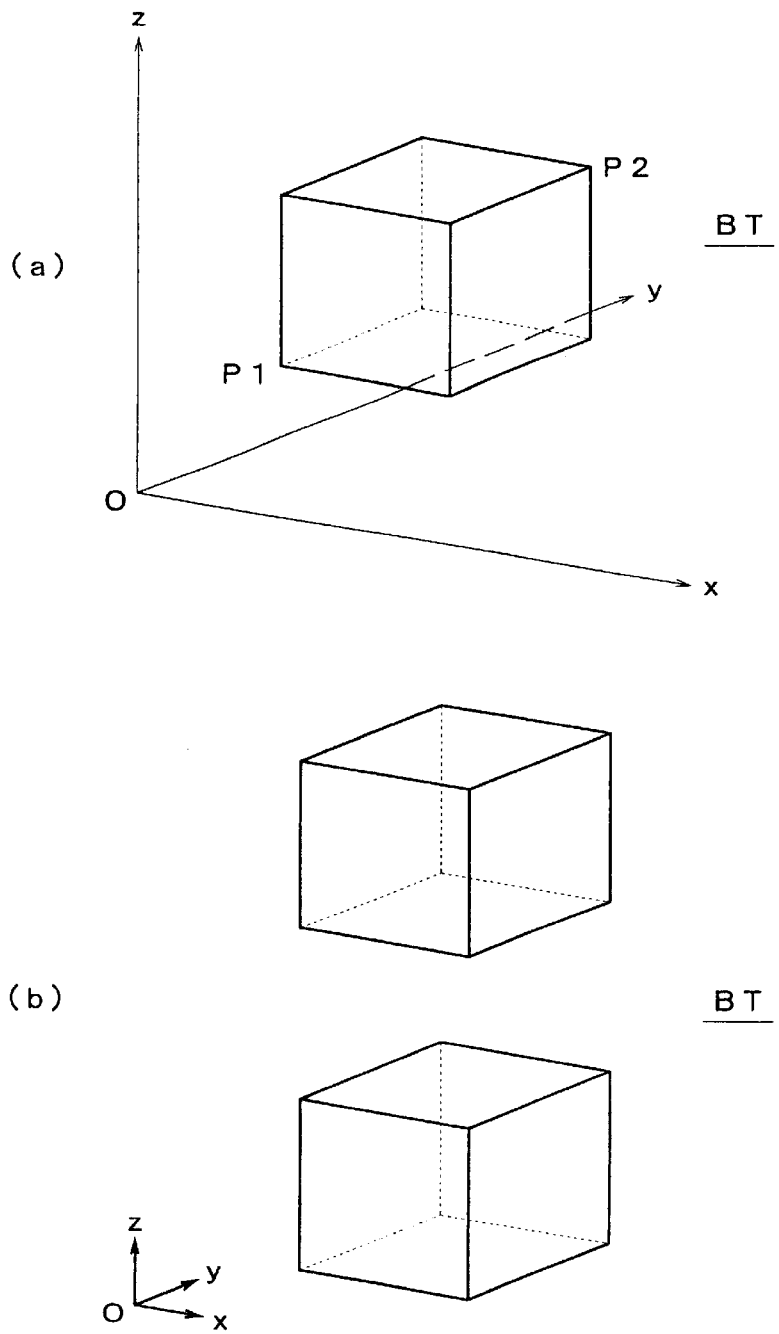
FIG. 16 is the first portion of an example showing the actual graphic in the process of generating a solid graphic by the 3D-CAD system according to one embodiment of the present invention.
Figure 18:
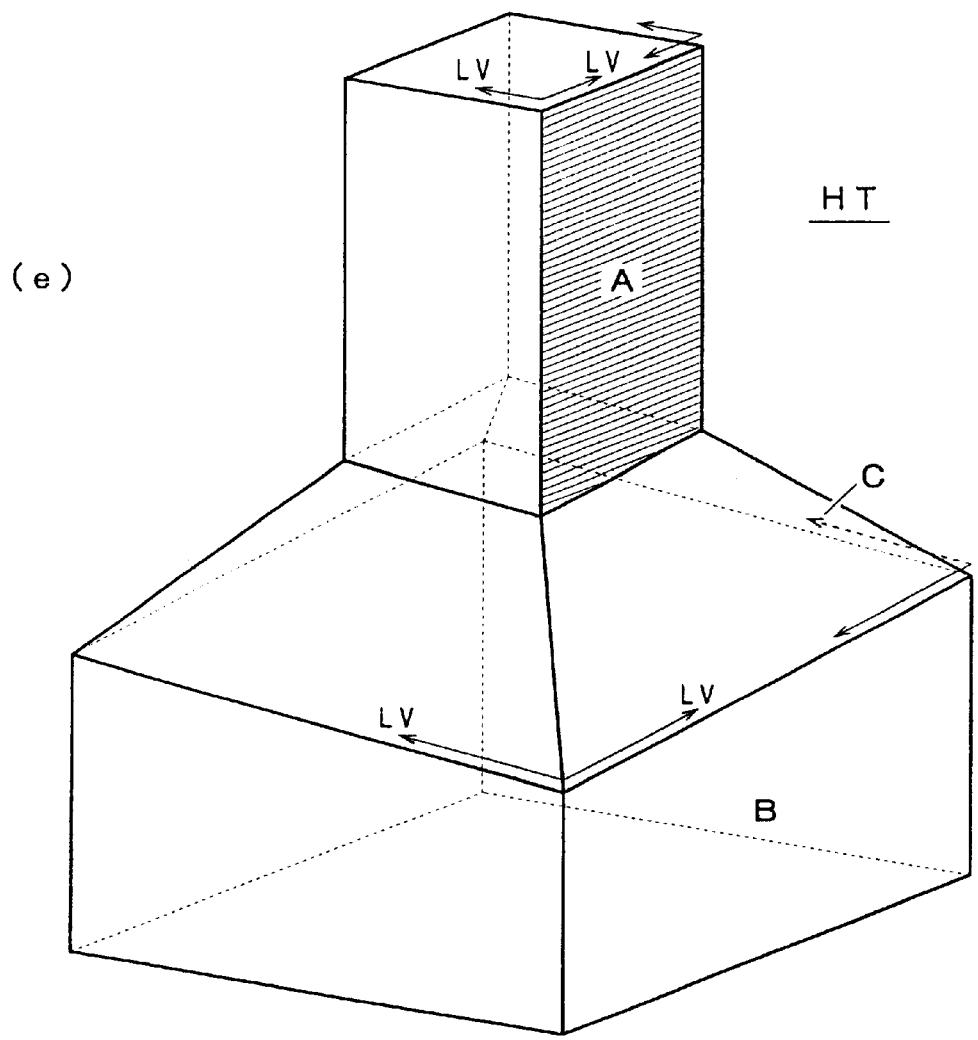
FIG. 18 is the third portion of an example showing the actual graphic in the process of generating a solid graphic by the 3D-CAD system according to one embodiment of the present invention.

FIG. 15 shows one example of a solid-graphic-modeling process using the 3D-CAD system of the present invention. According to one embodiment of the invention, for example as shown in FIGS. 16 through 20, various coordinate parameters $\alpha, \beta, \gamma, \delta, \ldots$ including area coordinate parameters are used to create a basic graphic element such as a surface element SE and the like, and the plural basic graphic elements are continuously connected to each other to create another basic graphic (basic topology graphic) BT. The created basic element BT is deformed continuously, so as to create the desired solid form (with identical topology). Thereby, the size of the basic graphic element is sufficiently large compared to the plane triangle patch PT of the conventional CAD system as shown in FIG. 3, and the boundary between each basic graphic element can be joined together continuously.

In detail, as shown in FIGS. 16 through 20, the 3D-CAD system according to the present invention basically defines the basic topology graphic BT by joining surface elements SE such as the above-explained curved surface triangular patches or curved-surface quadrilateral patches. As mentioned, other than the surface elements SE such as triangular surface elements SEt or quadrilateral surface elements SEq, point elements PE, line elements LE, and solid elements VE such as tetrahedrons, pentahedrons and hexahedrons are included in the basic graphic elements. The present system is aimed to obtain a desired three-dimensional graphic by performing a deforming process based on the basic topology graphic BT.

[Example of Graphic Processing]

With reference to FIGS. 16 through 20, a simple example of a graphic process is explained based on the solid graphic generating process example shown in FIG. 15. In the process flow example shown in FIG. 15, in routine R1, data related to basic graphic elements such as point elements PE, line elements LE, surface elements SE and solid elements VE are input. Here, the surface element SE includes triangular surface elements SEt and quadrilateral surface elements SEq, and the solid elements VE include tetrahedrons, pentahedrons (triangular prism) and hexahedrons.

(1) Input of Basic Graphic Elements

First, a drawing operation screen is displayed on display 4, and a basic graphic element is input using the input device 3. For example, when a "hexahedron" is selected from the basic graphic element items displayed in the menu box of the screen (not shown, but element names, examples of which are shown in FIG. 4, are selectively displayed), in the case of a rectangular prism, two diagonal points P1 and P2 are designated by either inputting coordinate values from a keyboard or moving the mouse cursor (in the case of a general hexahedron, eight vertexes including the diagonal points P1, P2 are designated). As a result, a hexahedron as shown in FIG. 16(a) is displayed. Moreover, the eight point elements PE which are the two points P1 and P2 and the remaining six vertexes automatically computed, the twelve line elements LE, the six quadrilateral surfaces (SEq), and the hexahedron element VE (VEh), are each automatically input to the system in the form shown in FIG. 13.

According to the method above, the hexahedron (VEh) was designated as a result. However, another process can be used. For example, a "point" is designated from the menu box, and eight vertexes are created at first. Then, from the eight vertexes, four vertexes are sequentially selected as groups to create six quadrilateral surfaces (SEq), and then these six quadrilateral surfaces (SEq) are used to form a solid. Or a "quadrilateral surface" is first designated fom the menu box, and two quadrilateral surfaces (SEq) forming the upper and lower surfaces of the solid are created, and then, four quadrilateral surfaces (SEq) are created between these upper and lower surfaces (creating surfaces from vertexes of upper and lower surfaces). Thereafter, these six quadrilateral surfaces (SEq) are used to form a solid.

Next, by inputting another hexahedron (VEh) based on a similar method, two hexahedrons are generated as shown in FIG. 16(b). It is essential to define at first the vertexes constituting the hexahedron, and it is one of the fundamentals for creating a basic graphic.

(2) Setting and Generating Basic Graphics

In routine R2, the setting and generating of a basic graphic BT is carried out by composing/coupling or removing the basic graphic elements. For example, the upper hexahedron (VEh) of FIG. 16(b) can be split into a group A of five quadrilateral surfaces (SEq) composed of the upper surface and four side surfaces (excluding the bottom surface) by removing the bottom surface and disengaging the sharing of four boundary lines. The lower hexahedron (VEh) can be split into a group B of five quadrilateral surfaces (SEq) composed of the bottom surface and four side surfaces (excluding the upper surface) by removing the upper surface and disengaging the sharing of four boundary lines. Thereby, the two hexahedrons (VEh) are changed to surface groups A and B without a bottom surface or an upper surface. Moreover, by utilizing the above-explained method designating a "point" or a"quadrilateral surface" from the menu box, the groups A, B hexahedrons without a bottom surface or an upper surface can be genarated by creating two groups of five quadrilateral surfaces (SEq) and by composing/coupling these surfaces to each group [by sharing the boundary lines].

Next, four "lines" connecting the lower four vertexes of the A and the upper four vertexes of the B are newly defined. By using these "lines" and the four boundary lines constituting the lower and upper edges of both groups A and B, four quadrilateral surfaces (SEq) C are defined between the surface groups A and B, as shown in FIG. 17(c). Thereby, a basic hollow graphic BT having two surface groups A and B each having five quadrilateral surfaces connected by four quadrilateral surfaces (SEq) C is created. Further, a basic graphic element itself as shown in FIGS. 16(a) and (b) without any modification can also be handled as the basic graphic BT.

(3) Deformation of Basic Graphic

In routine R3, the various control vectors in the basic graphic BT is adjusted to deform the basic graphic BT. In a deformation menu box of the screen, "move/displacement point position" is selected, and the desired vertex and the displacement/location is designated. Thereby, the corresponding vertex vector of the basic graphic BT in FIG. 17(c) is controlled, and by a process for expanding the horizontal boundary line of the lower quadrilateral surface group B, a hollow deformed graphic HT as shown in FIG. 17(d) can be created. Further, by evenly expanding the perpendicular boundary lines of the upper quadrilateral surface group A and by unevenly expanding the perpendicular boundary lines of the lower quadrilateral surface group B of the deformed graphic HT of FIG. 17(d), a hollow deformed graphic HT as shown in FIG. 18(e) is created.

The deformed graphic HT shown in FIG. 18(e) can further be deformed for example by providing a curve to the prismatic upper and lower quadrilateral surface groups A and B, in order to create a cylinder or a prism having rounded corners. In order to create such graphic, "continuation of corner/line" is designated from the deformation menu box of the screen, and as for the upper quadrilateral surface group A, eight upper and lower boundary lines excluding the four perpendicular boundary lines from the twelve boundary lines is selected. Then, for each boundary line, the line control vectors (tangent vectors) LV at each connection point are mutually extended to the opposite directions with the same length, the process of which is called a tangent continuity process. As shown in the upper portion of FIG. 19(f), each boundary line is smoothed and continued, and the upper surface group A is deformed into a cylinder.

Figure 19:
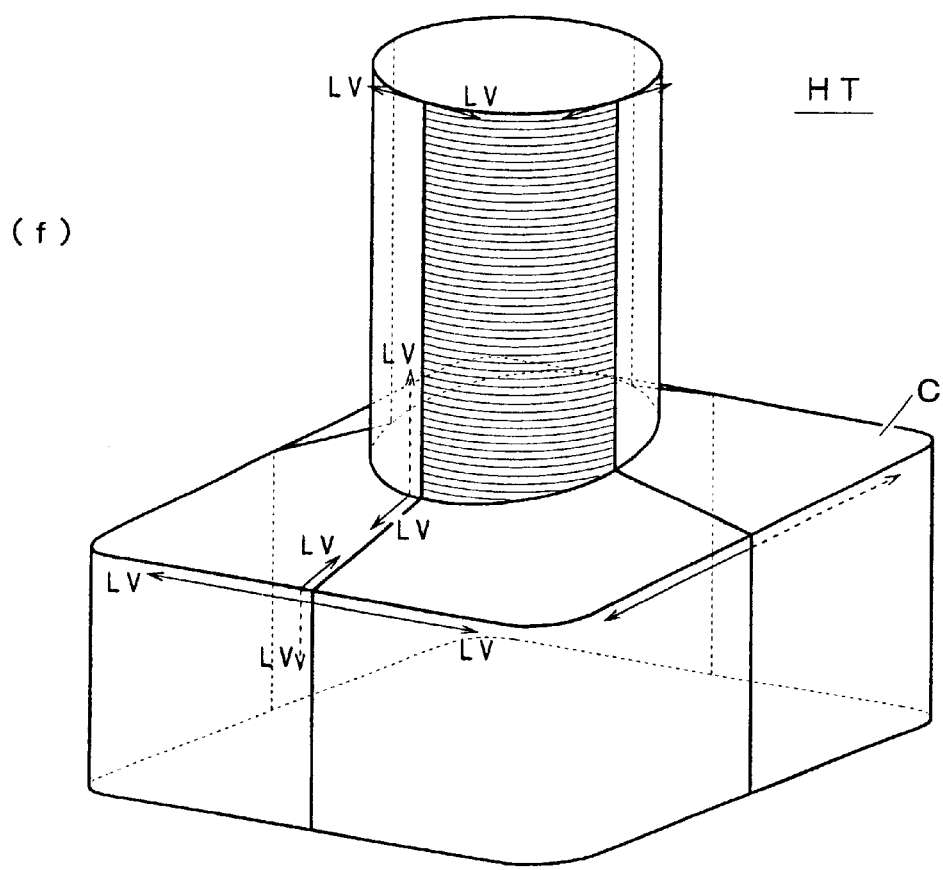
FIG. 19 is the fourth portion of an example showing the actual graphic in the process of generating a solid graphic by the 3D-CAD system according to one embodiment of the present invention.
Figure 20:
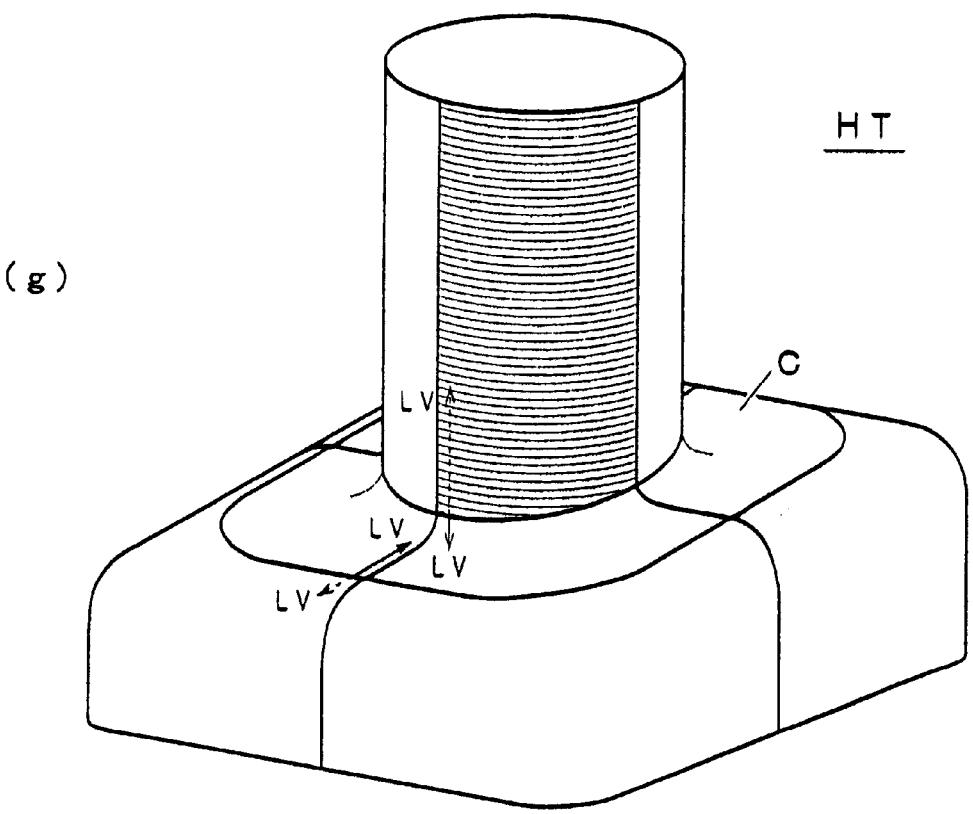
FIG. 20 is the fifth portion of an example showing the actual graphic in the process of generating a solid graphic by the 3D-CAD system according to one embodiment of the present invention.

The similar tangent continuity process is applied to the lower quadrilateral surface group B. The mutually equalized line control vectors (tangent vectors) LV are set greater than in the case of the upper group A, then as shown in the lower portion of FIG. 19(f), the boundary lines are connected smoothly, and the lower quadrilateral surface group B is deformed to a prismatic cylinder having rounded corners. Thereby, the deformed graphic HT as shown in FIG. 19 is obtained. In other words, a continuity process adjusting the directions and sizes (curvature) of the line control vectors LV is performed to the connected border lines of the upper and lower groups A and B of FIG. 18(e) with varying curvature between the upper and lower groups. Thereby, as shown in FIG. 19(f), the four quadrilateral surfaces (SEq) of the upper and lower groups A and B are smoothly connected, and according to the above process, the upper surface group A is cylinderized, and the lower surface group B is formed to have rounded side corners which are similar to those formed by a fillet processing.

Moreover, when a tangent continuity process is performed to the connection between the vertical border lines of the upper and lower surface groups A and B and the boundary lines of the intermediate surface group C, with the line control vectors LV of each boundary line facing the opposite directions and with different sizes (curvatures), a deformed graphic HT as shown in FIG. 20(g) is obtained. That is, in FIG. 19(f), between the upper group (cylinder) A-intermediate group (connection) C-lower group (prismatic portion with rounded corners) B, the vertical connections between the three areas are provided with continuity by matching the directions of line control vectors LV but with a different curvature, a deformed graphic HT as shown in FIG. 20(g) is obtained, where the groups A, B and C are smoothly connected together.

According to the present invention, the differential continuity between surfaces are stored even after deformation processes. That is, according to the present invention, the smooth connection between surfaces obtained by the tangent continuity process is stored even after deformation, so that the graphic can be deformed into various shapes while maintaining its continuity.

(4) Shading (Coloring, Shadowing)

Figure 21:
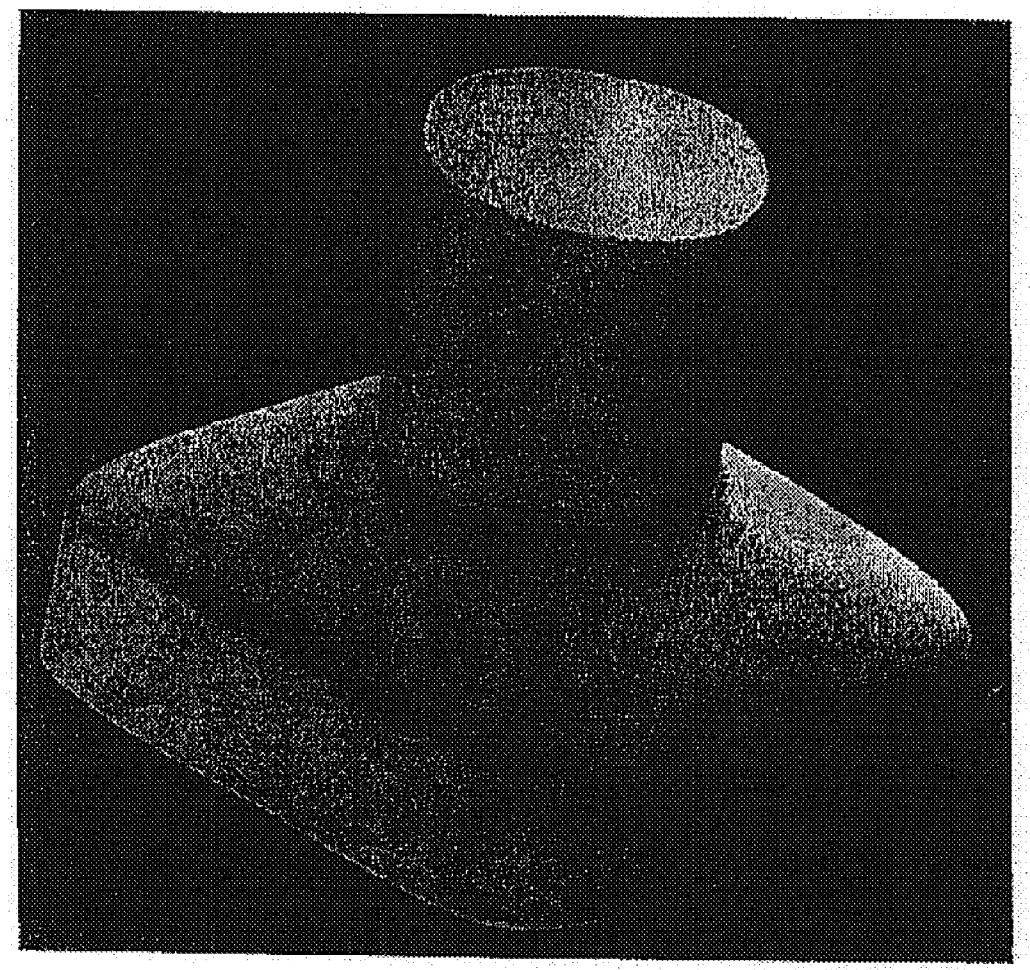
FIG. 21 is an example of the actual screen display obtained through the solid graphic generation process of the 3D-CAD system according to one embodiment of the present invention.

Routine R4 sets the position and direction of a light source and a viewpoint for the original graphic BT or the deformed graphic HT obtained in routines R1 through R3, and performs a well known shading (coloring, shadowing) process. FIG. 21 shows an actual screen display example where shading is performed to a deformed graphic similar to FIG. 20(g).

As explained, the 3D-CAD system according to one embodiment of the present invention has the following features as explained in (1)–(9) below:

(1) As shown in FIGS. 16 through 20, a basic topology graphic BT defined by surface elements SE can be deformed to sequentially generate new continuous space graphics HT conserving the same topology or uniform topology graphics. In other words, basically, the basic topology graphic BT is created using many curved surfaces SE expressed in vector function P designated by vector coefficients (A1–A10, etc.), and then it is deformed sequentially to generate another graphic HT having the same topology. In this case, the surface being continued in the original graphic BT or the deformed graphic HT is always continued in the following deformation processes. The present system is equipped with a function to maintain the tangent continuity of the surfaces, and a function to control the continuity of the surface curvature.

According to the 3D-CAD system of the present invention, the surface elements SE or the solid elements VE are continuously defined without performing discrete approximation, so the shape data base can be consistently shared by CAD, CAM and CAE. Therefore, a curved surface expressed by the CAD system can be used to control a machine tool directly, contributing to a next-generation machine tool technology that can be called "CAD to Direct Machine Control".

(2) The data quantity for expressing curved surfaces is very small, since the surface element SE itself (such as the triangular surface element SEt or the quadrilateral surface element SEq) being the basic element expresses a curved surface. For example, one curved quadrilateral patch can express a curved surface corresponding to dozens or hundreds of flat triangle patches in the polygonal approximation of the conventional CAD system. However, the cylinder expressed by the present system is not an exact circle, and is expressed for example with an error level of approximately H7, but this error can be reduced by increasing the split numbers of the cylindrical surface.

The system of the curved surface processing according to the present invention is advantageous in that the data quantity describing the shape is extremely small. For example, for a graphic of the same amplitude or complexity, the present data quantity is 1/100 of the conventional CAD system. Therefore, the curved surface processing according to the present invention can be applied to a personal computer enabling it to generate a very complex solid graphic that was not capable using the polygonal approximation process according to the conventional art. Moreover, the present invention is also advantageous in sending and receiving data through the internet that greatly limits the data quantity to be transmitted, and for example, the transmission of drawings applied to CALS (computer-aided acquisition and logistics support) which was impossible according to the conventional CAD system is realized by the present invention.

(3) According to the invention, the graphic is approximately expressed at first, but in principle, no approximate computation is performed in the following processes. Not performing any approximate computation in principle after the graphic is approximately expressed at first can be a limitation in defining the graphics, but it is merely a limitation similar to the limitation of a compass and a ruler used for drafting a two-dimensional figure, and the effect of reducing the load of the computation process greatly exceeds this limitation.

(4) As a method for forming complex surface, the present invention is capable of defining a tangent-continued surface relatively on another surface, and the relatively defined surface can be relatively deformed according to the deformation of the master surface. In other words, a regional surface can be bonded on another surface to express a surface which has a locally complexshape, and the bonded surface can be moved by sliding along the master surface, so when the master surface is deformed, the relatively-defined subordinate surface can be deformed accordingly.

(5) Any area of the graphics can be grasped and deformed.

(6) Trimming process is not necessary in expressing a round surface.

(7) A fillet surface where the curvature gradually changes can be defined as one portion of a continuous surface. In other words, the fillet is automatically formed on a portion of the surface, and a complex fillet shape can be expressed as one surface data.

(8) The continuity of the surface includes a function to control the continuity of the curvature, and therefore can be applied to advanced designing.

(9) No approximate computation is performed for the curved-surface processing, and a unique curved-surface rendering can be applied for the rendering process. The present invention has a possibility to provide a break through to a new world of rendering technology. For example, by computing the normal vectors at all the pixel points being displayed, a complete coloring (shading) called a "real shade" can be performed.

Generally, a computer process utilizes a lot of linear algebra. However, computers do not essentially specialize in linear algebra (matrix operation: implicit solution), so it is advantageous to perform the operation process using an explicit solution as much as possible, as with the curved-surface processing of the 3D-CAD system of the present invention. If it is necessary to perform implicit solution, the solution can be obtained using a simple convergence computation. The present system, which presupposes the above-mentioned computer processing, realizes the revolution from a linear graphic processing to a nonlinear graphic processing, pursuing the new technology trend transiting from linear algebra to nonlinear computational dynamics.

Moreover, even for a general engineering analytic computation, the present invention provides a technical environment advantageous to nonlinear computational dynamics simulating a nonlinear problem as a direct time-series phenomenon, compared to the conventional processing logic applying the linear algebra. The curved surface processing or the nonlinear processing logic according to the present invention appeals more to senses than to logic, making it more advantageous from the human-interface point of view.

As before mentioned, according to the present invention, line segment, surface segment (patch) and primitive solid element are adopted as the basic graphic elements, and these basic elements are defined using linear, area or volume coordinate parameters. These basic graphic elements are then connected mutually to form a graphic defined continuously by plural coordinate parameters, and it is deformed to generate a desired solid form. Further the surface elements are capable of expressing a larger region by one patch compared to the surface processing method of the conventional CAD system. Moreover, spatial 3D shape where surface patches are continuously connected, in other words, continuously differentiable spatial graphic can be defined, and since all the surfaces are approximately expressed using these surface patches, the surfaces can be handled consistently. Accordingly, the data quantity for describing the graphics is greatly reduced, and the load of the arithmetic processing of the computer can be reduced.

Moreover, according to the present invention, the generated solid graphic is defined by a group of points having spatial coordinates expressed by the cubic form of coordinate parameters, so by controlling the surface while maintaining the continuous connections between tangents on the end of the surfaces and not increasing the operation more than necessary, a sufficiently useful three-dimensional graphic expression is obtained.

Even further, according to the present invention, the point elements have three-dimensional coordinate data, the line elements have end point pointers and intermediate control point data, the surface elements have eternal line pointers and inner surface control point data, the solid elements have data expressing external surface pointers, and the point elements, the line elements and the surface elements have reference counter data. Accordingly, if an element is to be deleted, the reference counter data is referred to in order to confirm whether or not a certain element is a component of other elements, thereby effectively determining whether an element can be deleted or not.

Moreover, in addition to the above-mentioned characteristic effects, the present invention provides the following various technological advantages:

(1) Compared to the conventional CAD system, the present invention greatly reduces the data quantity, for as much as approximately 1/100 of the prior art, and therefore enables data transmission via the internet.

(2) The operation-processing-load of the computer is reduced, and the total system cost is reduced. Therefore, the present invention can even be practiced sufficiently using a low-level personal computer.

(3) The surfaces can be handled with consistency, thereby enabling to provide data common to designing, CAM and CAE.

We claim:
1. A three-dimensional CAD system comprising:
 means for setting a point element, and further setting a line element, a surface element and a solid element each defined using linear, area and volume coordinate parameters, respectively, said elements being adopted as basic graphic elements, wherein when said line element, said surface element and said solid element are each divided into line segments, surfaces and solids formed between an arbitrary point within said each element and an end point, a periphery line and a periphery surface of said element, respectively, said each linear, area and volume coordinate parameters express said arbitrary point by a length ratio, an area ratio and a volume ratio of said divided line segments, said surfaces and said solids, respectively;

means for connecting a plurality of said basic graphic elements by sharing mutual boundaries, thereby setting up a basic graphic form; and a means for directly deforming said basic graphic elements constituting said basic graphic form to thereby create a desired solid form maintaining continuous differentiability between said graphic elements and excluding said point element.

2. A three-dimensional CAD system according to claim 1, wherein said basic graphic elements excluding said point element are expressed by an all n-degree equation form (n being an integer of 3 or greater) of the coordinate parameters, the form being the sum of all terms consisting of n-degree combination of the coordinate parameters.

3. A three-dimensional CAD system according to claim 1, wherein said point element has three-dimensional position coordinate data representing its position directly; said line element has data designating the point elements on both ends thereof and data representing intermediate control points; said surface element has data designating the line elements constituting the boundary of said surface and data representing inner-surface control points; said solid element has data representing the data designating the surface elements constituting the border of said solid; and each point element, line element and surface element further has a reference counter showing how many other elements refer to said specific element.

4. A recording medium for a three-dimensional CAD system, to which is recorded a program comprising:

a step of setting a point element, and further setting a line element, a surface element and a solid element each defined by linear, area and volume coordinate parameters, respectively, said elements being adopted as basic graphic elements, wherein when said line element, said surface element and said solid element are each divided into line segments, surfaces and solids formed between an arbitrary point within said each element and an end point, a periphery line and a periphery surface of said element, respectively, said each linear, area and volume coordinate parameters express said arbitrary point by a length ratio, an area ratio and a volume ratio of said divided line segments, said surfaces and said solids, respectively;

a step of connecting a plurality of said set basic graphic elements by sharing mutual boundaries, thereby setting up a basic graphic form; and a step of directly deforming said basic graphic elements constituting said basic graphic form to thereby create a desired solid form maintaining continuous differentiability between said graphic elements excluding said point element.

* * * * *